US012684027B2

(12) United States Patent
Biatek et al.

(10) Patent No.: US 12,684,027 B2
(45) Date of Patent: Jul. 14, 2026

(54) METHOD FOR MEDIA STREAM PROCESSING AND APPARATUS FOR IMPLEMENTING THE SAME

(71) Applicant: ATEME, Velizy Villacoublay (FR)

(72) Inventors: Thibaud Biatek, Velizy Villacoublay (FR); Eric Toullec, Velizy Villacoublay (FR); Lucas Gregory, Velizy Villacoublay (FR)

(73) Assignee: ATEME, Velizy Villacoublay (FR)

( * ) Notice: Subject to any disclaimer, the term of this patent is extended or adjusted under 35 U.S.C. 154(b) by 135 days.

(21) Appl. No.: 18/521,173

(22) Filed: Nov. 28, 2023

(65) Prior Publication Data

US 2024/0179202 A1 May 30, 2024

(30) Foreign Application Priority Data

Nov. 28, 2022 (EP) ..................................... 22306749

(51) Int. Cl.
*H04L 65/61* (2022.01)
*H04L 65/75* (2022.01)

(52) U.S. Cl.
CPC .............. *H04L 65/61* (2022.05); *H04L 65/75* (2022.05)

(58) Field of Classification Search
CPC ................................. H04L 65/61; H04L 65/75
See application file for complete search history.

(56) References Cited

U.S. PATENT DOCUMENTS

| | | | | |
|---|---|---|---|---|
| 8,412,841 B1 * | 4/2013 | Swaminathan | .... | H04N 21/8456 |
| | | | | 709/236 |
| 2012/0023250 A1 * | 1/2012 | Chen | .................. | H04N 21/8456 |
| | | | | 709/231 |
| 2016/0142750 A1 * | 5/2016 | Huber | ................ | H04N 21/8456 |
| | | | | 725/116 |
| 2017/0078735 A1 * | 3/2017 | Greene | .......... | H04N 21/234363 |
| 2022/0248108 A1 * | 8/2022 | Hardin | .......... | H04N 21/440218 |

OTHER PUBLICATIONS

European Search Report issued Mar. 23, 2023, in corresponding European Application No. 22306749.7, 9 pages.

* cited by examiner

*Primary Examiner* — Oleg Survillo
(74) *Attorney, Agent, or Firm* — Maier & Maier, PLLC

(57) ABSTRACT

A method for processing a media stream is proposed, which comprises, at a media distribution unit comprising a processor: upon receiving, from a player device, a request for a media data segment of the media content stream, determining a media data chunk of the one or more media data chunks that corresponds to the segment and is available for distribution to the player device; determining a bootstrapping file of the one or more bootstrapping files that corresponds to the media data chunk, wherein the I-type image of the bootstrapping file corresponds to an image of a media data chunk that precedes the media data chunk in the media data segment; generating a response media data chunk by combining the media data chunk and the bootstrapping file; and serving the request based on the response media data chunk by sending the response media data chunk to the player device.

16 Claims, 15 Drawing Sheets

METHOD FOR MEDIA STREAM PROCESSING AND APPARATUS FOR IMPLEMENTING THE SAME

CROSS-REFERENCE TO RELATED APPLICATIONS

This application claims priority benefit under 35 U.S.C. § 119(d) from European Patent Application No. 22 306 749.7, filed Nov. 28, 2022, the disclosure of which is incorporated by reference herein in its entirety.

FIELD

The present disclosure relates to the field of media distribution, and more particularly to video distribution, for example in an Over The Top (OTT) network.

BACKGROUND

Broadcast television has significantly transformed over the recent years. New audiovisual services, sometimes referred to as "non-linear services", such as Video On Demand (VOD), Catch-Up TV or Replay, have emerged, on top of traditional dynamic mode broadcasting of so-called "linear" or "live" TV services (Asymmetric Digital Subscriber Line (ADSL), Satellite, Cable, IPTV, Fiber, DVB), via operators such as cable operator or Internet triple-play providers.

On the other hand, the development of new terminals with increased computation capabilities, the ever-growing demand for playing multimedia contents regardless on the location of the end-user terminal (TV everywhere), as well as the development of network infrastructures offering ever-increasing bandwidth to their end-users have fostered the emergence of a new multimedia distribution market, referred to as Over-The-Top (OTT), which does not require its operators to own their access network towards end users. The OTT market operates on non-managed networks to provide multi-screen services through traditional broadcasters such as TV operators or telecom operators.

Live TV broadcasting services are typically designed to achieve a compromise taking into account different factors, among which video quality, rate, latency, and zapping time. The above parameters influence each other, for example in that the coding configuration used for encoding multimedia streams influences the coding efficiency, and as a consequence the quality of the delivered video for a given rate. For example, distribution protocols have been improved through the emergence of a low latency version of most distribution protocols in order to reduce the end-to-end latency involved in multimedia distribution, such as, for example, OTT distribution.

One of the current challenges for OTT distribution of live TV broadcasting services is to offer a maximum quality of experience (QoE) while limiting the weight of video streams on distribution networks and offering a zapping time and a latency that are both reduced.

SUMMARY

There is therefore a need for providing an improved media content stream processing scheme that can be used in OTT live distribution networks for offering both reduced latency and zapping time.

There is also a need for providing an improved media content stream processing scheme and system and apparatuses implementing the same that address at least some of the above-described drawbacks and shortcomings of the conventional technology in the art.

It is an object of the present subject disclosure to provide an improved method for processing a multimedia (e.g. video) content stream and system and apparatuses implementing the same that address at least some of the above-described drawbacks and shortcomings of the conventional technology in the art.

To achieve these objects and other advantages and in accordance with the purpose of the present subject disclosure, as embodied and broadly described herein, in one aspect of the present subject disclosure, a method for processing a media content stream is proposed, which comprises, at a media distribution unit of a video distribution network, the media distribution unit comprising a processor and a memory for storing media data, wherein the memory is configured to store one or more media data chunks of the media content stream received by the media distribution unit, and wherein the memory is further configured to store one or more bootstrapping files respectively corresponding to the one or more media data chunks, each of the one or more bootstrapping files comprising a respective sequence of one or more images starting with an I-type encoded image: upon receiving (e.g. from a player device) a request for a media data segment of the media content stream, determining a media data chunk of the one or more media data chunks that corresponds to the segment and is available for distribution (e.g. to the player device); determining a bootstrapping file of the one or more bootstrapping files that corresponds to the media data chunk, wherein the I-type image of the bootstrapping file corresponds to an image of a media data chunk that precedes the media data chunk in the media data segment; generating a response media data chunk by combining the media data chunk and the bootstrapping file; and serving the request based on the response media data chunk (e.g. by sending the response media data chunk to the player device).

The proposed method advantageously introduces the use of bootstrap data corresponding to a media data chunk of a target media content stream for which a request is received, in order to build, based on the bootstrap data and the media data chunk, a response media data chunk which a video player device can use to start decoding and playing multimedia data of the target media content stream. Thanks to the combined use of bootstrap data and corresponding multimedia data, end-to-end latency for accessing data of a target media content stream can be reduced. In addition, in cases where the request for data of the target media content stream is in the context of a zapping, that is, a switch from a first channel corresponding to an initial media content stream to a second channel corresponding to the target media content stream, the use of the bootstrap data corresponding to the media data chunk of the target media content stream also advantageously allows reaching a reduced zapping time. Therefore both a reduced latency and a reduced zapping time can be achieved, including in an OTT multimedia distribution system.

According to another aspect of the present subject disclosure, a method for processing a media content stream is proposed, which comprises, at a media distribution unit of a video distribution network, the media distribution unit comprising a processor and a memory for storing media data, the memory being configured to store one or more media data chunks of the media content stream received by the media distribution unit, and the memory being further configured to store one or more bootstrapping file respectively corresponding to the one or more media data chunks, each of the one or more bootstrapping files comprising a respective sequence of one or more images starting with an I-type encoded image: Upon receiving (e.g. from a player) a request for data of the media content stream, determining a reception time of the request; determining, based on the received request and the reception time, a media data chunk of the one or more media data chunks and a bootstrapping file corresponding to the media data chunk; generating a response media data chunk by combining the media data chunk and the bootstrapping file; and serving the request based on the response media data chunk (e.g. by sending the response media data chunk to the player).

According to yet another aspect of the present subject disclosure, a method for encoding video data comprising a sequence of images is proposed, which comprises: encoding a first image of the sequence of images using one or more previously encoded images of the sequence to generate an encoded first image; encoding the first image as an I-type encoded image; generating a media data chunk that comprises the encoded first image; and generating a bootstrapping file that comprises a sequence of one or more images and starts with the I-type encoded image.

In one or more embodiments, the proposed method for encoding video data comprising a sequence of images may comprise: encoding a first image of the sequence of images to generate an encoded first image; based on that the first image was encoded using one or more previously encoded images of the sequence, encoding the first image as an I-type encoded image; generating a media data chunk that comprises the encoded first image; and generating a bootstrapping file that comprises a sequence of one or more images, wherein based on that the first image was encoded using one or more previously encoded images of the sequence, the bootstrapping file starts with the I-type encoded image, and otherwise starts with the encoded first image.

The method according to any of the preceding claims, wherein the media data chunk may be a Common Media Application Format, CMAF, chunk, CMAF Low Latency, CMAF-LL, chunk, Dynamic Adaptive Streaming over Hypertext Transfer Protocol, HTTP, DASH, chunk, DASH Low Latency, DASH-LL, chunk, HTTP Live Streaming, HLS, chunk, or a HLS Low Latency, HLS-LL, chunk.

The method according to any of claims 1-11, wherein the bootstrapping file comprises an I-type encoded image, an I-type encoded image and a P-type encoded image that refers to the I-type encoded image, or an I-type encoded image and a B-type encoded image that refers to the I-type encoded image.

In one or more embodiments, the request may be a request from a player for switching from receiving previous channel data corresponding to a previous media content stream to receiving new channel data corresponding to the media content stream. The request may therefore in such embodiments be a zapping request, for which the zapping response time of the media distribution unit implementing embodiments of the present subject disclosure may advantageously be reduced.

In one or more embodiments, determining the media data chunk may comprise: obtaining timestamp information of the media data chunk and selecting the media data chunk among the one or more media data chunks based on the timestamp information.

In one or more embodiments, the media data chunk may not comprise any I-type encoded image.

In one or more embodiments, the media content stream may comprise a primary media content stream and a secondary media content stream, wherein the primary media content stream comprises the one or more media data chunks, and the secondary media content stream comprises the one or more bootstrapping files corresponding to the one or more media data chunks of the primary media content stream. In such embodiments, the resolution of encoded images of the primary media content stream may be different from the resolution of encoded images of the secondary media content stream. Further, the primary media content stream may not comprise any media data chunk that comprises an I-type encoded image. Therefore the proposed scheme may also advantageously be used with a primary media content stream comprising a sequence of segments, each comprising a sequence of chunks, none of which may include an I-type encoded image.

In one or more embodiments, the media data chunk and the bootstrapping file may correspond to each other in that they each comprise a P-type encoded image generated by P-type encoding a same image, wherein the same image corresponds to a first image of source video data comprising a sequence of images that was encoded using one or more previously encoded images of the sequence of images, and wherein the I-type image of the bootstrapping file corresponds to a second image preceding in a display sequence the first image in the source video data, the second image being encoded using intra prediction.

In one or more embodiments, the combining the media data chunk and the bootstrapping file may comprise: in case of the bootstrapping file corresponding to the media data chunk comprising an I-type image and a P-type image, the I-type image corresponding to an image of a previous media data chunk preceding (e.g. immediately) the media data chunk, and the P-type image referring to the I-type image and corresponding to a P-type image of the media data chunk, the P-type image of the media data chunk being the last image of the media data chunk: replacing the P-type image of the media data chunk with the I-type image and the P-type image of the bootstrapping file; in case of the bootstrapping file corresponding to the media data chunk comprising an I-type image and a B-type image, the I-type image corresponding to an image of a previous media data chunk preceding (e.g. immediately) the media data chunk, and the B-type image referring to the I-type image and corresponding to a B-type image of the media data chunk, the B-type image of the media data chunk being the last image of the media data chunk: replacing the B-type image of the media data chunk with the I-type image and the B-type image of the bootstrapping file; or in case of the bootstrapping file corresponding to the media data chunk comprising an I-type image without a P-type image or a B-type image, the I-type image corresponding to an image of a previous media data chunk preceding (e.g. immediately) the media data chunk: replacing the corresponding image of the media data chunk with the I-type image of the bootstrapping file.

In one or more embodiments, the one or more media data chunks may be Common Media Application Format, CMAF, chunks, CMAF Low Latency, CMAF-LL, chunks, Dynamic Adaptive Streaming over Hypertext Transfer Protocol, HTTP, DASH, chunks, DASH Low Latency, DASH-LL, chunks, HTTP Live Streaming, HLS, chunks, or HLS Low Latency, HLS-LL, chunks.

In one or more embodiments, the proposed method for encoding video data may further comprise: generating a primary media content stream comprising the media data chunk; generating a secondary media content stream comprising the bootstrapping file; and transmitting the primary and secondary media content streams to a media distribution unit of a video distribution network.

In one or more embodiments, the secondary media content stream may be generated with a resolution that is different from that of the primary media content stream.

In one or more embodiments, the respective sequence of one or more images of each of the one or more bootstrapping files may comprise a respective I-type encoded image with no P-type encoded image or B-type encoded image, a respective I-type encoded image and a respective P-type encoded image that refers to the respective I-type encoded image, or a respective I-type encoded image and a respective B-type encoded image that refers to the respective I-type encoded image.

In some embodiments, the media data chunk may comprise one or more of an audio chunk, a video chunk, and/or a text chunk.

In some embodiments, the media data chunk may be a Common Media Application Format, CMAF, chunk.

In yet another aspect of the present subject disclosure, an apparatus is proposed, which comprises a processor, and a memory operatively coupled to the processor, wherein the apparatus is configured to perform a method as proposed in the present subject disclosure.

For example, in an aspect of the present subject disclosure, a video encoder is proposed, which comprises a processor, and a memory operatively coupled to the processor, wherein the video encoder is configured to perform a method for encoding video data as proposed in the present subject disclosure.

For example, in an aspect of the present subject disclosure, a media distribution unit is proposed, which comprises a processor, and a memory operatively coupled to the processor, wherein the media distribution unit is configured to perform a method for processing a media content stream as proposed in the present subject disclosure.

In yet another aspect of the present subject disclosure, a media distribution system configured to distribute video streams is proposed, which comprises a media encoder as proposed in the present subject disclosure, the media encoder being configured to encode video data by the system according to embodiments of the present subject disclosure, and a media distribution unit as proposed in the present subject disclosure, the media distribution unit being configured to process video streams received from the media encoder.

In yet another aspect of the present subject disclosure, a non-transitory computer-readable medium encoded with executable instructions which, when executed, causes an apparatus comprising a processor operatively coupled with a memory, to perform a method as proposed in the present subject disclosure, is proposed.

For example, in some embodiments, the present subject disclosure provides a non-transitory computer-readable medium encoded with executable instructions which, when executed, causes a media distribution apparatus comprising a processor operatively coupled with a memory for storing media data, the memory being configured to store one or more media data chunks of a media content stream received by the media distribution apparatus, and the memory being further configured to store one or more bootstrapping file respectively corresponding to the one or more media data chunks, each of the one or more bootstrapping files comprising a respective sequence of one or more images starting with an I-type encoded image, to perform a method for processing the media content stream which comprises: Upon receiving (e.g. from a player) a request for data of the media content stream, determining, by the processor, a reception time of the request; determining, by the processor, based on the received request and the reception time, a media data chunk of the one or more media data chunks and a bootstrapping file corresponding to the media data chunk; generating, by the processor, a response media data chunk by combining the media data chunk and the bootstrapping file; and serving, by the processor, the request based on the response media data chunk (e.g. by sending the response media data chunk to the player).

As another example, in some embodiments, the present subject disclosure provides a non-transitory computer-readable medium encoded with executable instructions which, when executed, causes a media distribution apparatus comprising a processor operatively coupled with a memory for storing media data, the memory being configured to store one or more media data chunks of a media content stream received by the media distribution apparatus, and the memory being further configured to store one or more bootstrapping file respectively corresponding to the one or more media data chunks, each of the one or more bootstrapping files comprising a respective sequence of one or more images starting with an I-type encoded image, to perform a method for processing the media content stream which comprises: Upon receiving (e.g. from a player) a request for data of the media content stream, determining, by the processor, a reception time of the request; determining, by the processor, based on the received request and the reception time, a media data chunk of the one or more media data chunks and a bootstrapping file corresponding to the media data chunk; generating, by the processor, a response media data chunk by combining the media data chunk and the bootstrapping file; and serving, by the processor, the request based on the response media data chunk (e.g. by sending the response media data chunk to the player).

As another example, in some embodiments, the present subject disclosure provides a non-transitory computer-readable medium encoded with executable instructions which, when executed, causes an apparatus comprising a processor operatively coupled with a memory for storing media data, the memory being configured to store one or more media data chunks of the media content stream received by the media distribution unit, and the memory being further configured to store one or more bootstrapping file respectively corresponding to the one or more media data chunks, each of the one or more bootstrapping files comprising a respective sequence of one or more images starting with an I-type encoded image, to perform a method for processing a media content stream as proposed, which comprises: upon receiving (e.g. from a player) a request for data of the media content stream, determining, by the processor, a reception time of the request; determining, by the processor, based on the received request and the reception time, a media data chunk of the one or more media data chunks and a bootstrapping file corresponding to the media data chunk; generating, by the processor, a response media data chunk by combining the media data chunk and the bootstrapping file; and serving, by the processor, the request based on the response.

As another example, in some embodiments, the present subject disclosure provides a non-transitory computer-readable medium encoded with executable instructions which, when executed, causes an apparatus comprising a processor operatively coupled with a memory for storing media data to perform a method for encoding video data comprising a sequence of images as proposed, which comprises: encoding, by the processor, a first image of the sequence of images using one or more previously encoded images of the sequence to generate an encoded first image; encoding, by the processor, the first image as an I-type encoded image; generating, by the processor, a media data chunk that comprises the encoded first image; and generating, by the processor, a bootstrapping file that comprises a sequence of one or more images and starts with the I-type encoded image.

In yet another aspect of the present subject disclosure, a computer program product comprising computer program code tangibly embodied in a computer readable medium, said computer program code comprising instructions to, when provided to a computer system and executed, cause said computer to perform a method as proposed in the present subject disclosure, is proposed.

In another aspect of the present subject disclosure, a data set representing, for example through compression or encoding, a computer program as proposed herein, is proposed.

It should be appreciated that the present subject disclosure can be implemented and utilized in numerous ways, including without limitation as a process, an apparatus, a system, a device, and as a method for applications now known and later developed. These and other unique features of the system disclosed herein will become more readily apparent from the following description and the accompanying drawings.

BRIEF DESCRIPTION OF THE DRAWINGS

The present subject disclosure will be better understood and its numerous objects and advantages will become more apparent to those skilled in the art by reference to the following drawings, in conjunction with the accompanying specification, in which.

DETAILED DESCRIPTION

Figure 1A:
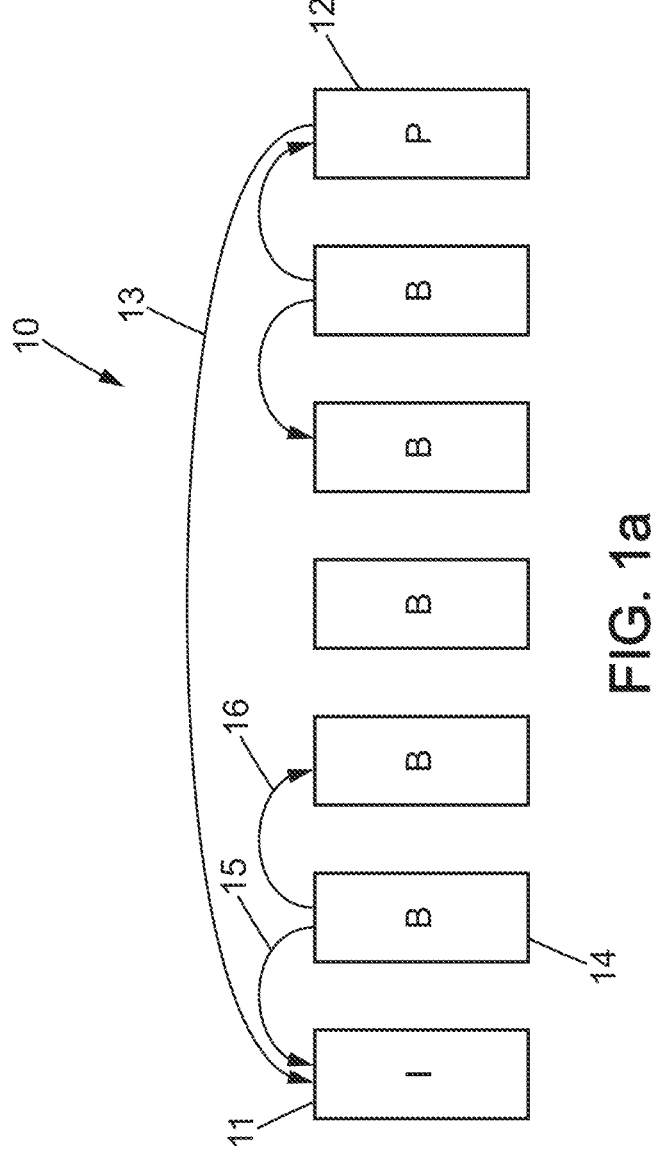
FIG. 1a illustrates an exemplary GOP structure that may be used in accordance with one or more embodiments.

For simplicity and clarity of illustration, the drawing figures illustrate the general manner of construction, and descriptions and details of well-known features and techniques may be omitted to avoid unnecessarily obscuring the discussion of the described embodiments of the present subject disclosure. Additionally, elements in the drawing figures are not necessarily drawn to scale. For example, the dimensions of some of the elements in the figures may be exaggerated relative to other elements to help improve understanding of embodiments of the present subject disclosure. Certain figures may be shown in an idealized fashion in order to aid understanding, such as when structures are shown having straight lines, sharp angles, and/or parallel planes or the like that under real-world conditions would likely be significantly less symmetric and orderly. The same reference numerals in different figures denote the same elements, while similar reference numerals may, but do not necessarily, denote similar elements.

In addition, it should be apparent that the teaching herein can be embodied in a wide variety of forms and that any specific structure and/or function disclosed herein is merely representative. In particular, one skilled in the art will appreciate that an aspect disclosed herein can be implemented independently of any other aspects and that several aspects can be combined in various ways.

The present disclosure is described below with reference to units, functions, engines, subsystems, block diagrams and flowchart illustrations of the methods, systems, and computer program according to one or more exemplary embodiments. Each described unit, function, engine, block, subsystem of the block diagrams and flowchart illustrations can be implemented in hardware, software, firmware, middleware, microcode, or any suitable combination thereof. If implemented in software, the units, functions, engines, blocks, subsystems of the block diagrams and/or flowchart illustrations can be implemented by computer program instructions or software code, which may be stored or transmitted over a computer-readable medium, or loaded onto a general purpose computer, special purpose computer or other programmable data processing apparatus to produce a machine, such that the computer program instructions or software code which execute on the computer or other programmable data processing apparatus, create the means for implementing the units, functions, engines, subsystems, blocks of the block diagrams and/or flowchart illustrations described herein.

Embodiments of computer-readable media includes, but are not limited to, both computer storage media and communication media including any medium that facilitates transfer of a computer program from one place to another. As used herein, a "computer storage media" may be any physical media that can be accessed by a computer or a processor. In addition, the terms "memory" and "computer storage media" include any type of data storage device, such as, without limitation, a hard drive, a flash drive or other flash memory devices (e.g. memory keys, memory sticks, key drive), CD-ROMs or other optical data storage devices, DVDs, magnetic disk data storage devices or other magnetic data storage devices, data memory components, RAM, ROM and EEPROM memories, memory cards (smart cards), solid state drive (SSD) memories, and any other form of medium able to be used to transport or store or memorize data or data structures able to be read by a computer processor, or a combination thereof. Furthermore, various forms of computer-readable media may transmit or carry instructions to a computer, such as a router, a gateway, a server, or any data transmission equipment, whether this involves wired transmission (via coaxial cable, optical fiber, telephone wires, DSL cable or Ethernet cable), wireless transmission (via infrared, radio, cellular, microwaves) or virtualized transmission equipment (virtual router, virtual gateway, virtual tunnel end, virtual firewall). According to the embodiments, the instructions may comprise code in any computer programming language or computer program element, such as, without limitation, the languages of assembler, C, C++, Visual Basic, HyperText Markup Language (HTML), Extensible Markup Language (XML), HyperText Transfer Protocol (HTTP), PHP Hypertext Preprocessor (PHP), SQL, MySQL, Java, JavaScript, JavaScript Object Notation (JSON), Python, and bash scripting.

Unless specifically stated otherwise, it will be appreciated that throughout the following description discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

The terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Additionally, the word "exemplary" is used herein to mean "serving as an example, instance, or illustration". Any embodiment or design described herein as "exemplary" is not necessarily to be construed as preferred or advantageous over other embodiments or designs. The terms "in particular", "for example", "example", "typically" are used in the present description to denote examples or illustrations of non-limiting embodiments that do not necessarily correspond to preferred or advantageous embodiments with respect to other possible aspects or embodiments.

The terms "operationally coupled", "coupled", "mounted", "connected" and their various variants and forms used in the present description refer to couplings, connections and mountings that may be direct or indirect, and comprise in particular connections between electronic equipment or between portions of such equipment that allow operations and modes of operation as described in the present description. In addition, the terms "connected" and "coupled" are not limited to physical or mechanical connections or couplings. For example, an operational coupling may include one or more wired connection(s) and/or one or more wireless connection(s) between two or more items of equipment that allow simplex and/or duplex communication links between the equipment or portions of the equipment. According to another example, an operational coupling or a connection may include a wired-link and/or wireless coupling for allowing data communications between a server of the proposed system and another item of equipment of the system.

"Server" or "platform" in the present subject disclosure means any (virtualized or non-virtualized) point of service or computer device or system performing data processing operations, one or more databases, and/or data communication functions. For example, and without limitation, the term "server" or the term "platform" may refer to a physical processor operationally coupled to associated communication, database and data storage functions, or refer to a network, a group, a set or a complex of processors and associated data storage and networking equipment, and to an operating system and one or more database system(s) and application software supporting the services and functions provided by the server. A server or platform may be configured to operate in or as part of a cloud computing environment. A computer device or system may be configured so as to send and receive signals, via wireless and/or wired transmission networks(s), or be configured so as to process and/or store data or signals, and may therefore operate as a server. Equipment configured so as to operate as a server may thus include, by way of non-limiting example, dedicated servers mounted on a rack, cloud-based servers, desktop computers, laptop computers, service gateways (sometimes called "box" or "home gateway"), multimedia decoders (sometimes called "set-top boxes"), integrated equipment combining various functionalities, such as two or more of the abovementioned functionalities. The servers may vary greatly in terms of their configuration or their capabilities, but a server will generally include one or more central processing unit(s) and a memory. A server may also include one or more item(s) of mass memory equipment, one or more electric power supply/supplies, one or more wireless and/or wired network interface(s), one or more input/output interface(s), one or more operating system(s), such as Windows Server, Mac OS X, Unix, Linux, FreeBSD, or an equivalent.

The terms "application" or "application program" (AP) and their variants ("app", "web app", etc.) as used in the present description correspond to any tool that operates and is operated by way of a computer in order to provide or execute one or more function(s) or task(s) for a user or another application program. In order to interact with an application program and control it, a user interface may be provided on the equipment on which the application program is implemented. For example, a graphical user interface (or GUI) may be generated and displayed on a screen of the user equipment, or an audio user interface may be played back to the user using a speaker, a headset, or an audio output.

The terms "media data", "media content", "multimedia data", and "multimedia content" as used interchangeably in the present description correspond to any audio, video, and/or text, or audio-visual data content, with or without closed captions, open captions, subtitles, timed text, or visual descriptors. Furthermore, the terms "media" and "multimedia" are used interchangeably in the present subject disclosure.

In the present description, the terms "media unit", "media object" or "media data object" as used interchangeably in the present description correspond to any data unit, data packet, or data set comprising media data and/or metadata (in particular metadata related to media data). For example, a media stream may be segmented into various media objects, such as media data chunks (for a stream supporting low latency), media data fragments, and media data segments. According to example embodiments of the present disclosure, chunks, fragments, and segments may be examples of media objects carrying media data and metadata related thereto. A hierarchical structure may in some embodiments be used, for example according to which chunks may be smaller media objects than fragments and segments, and a fragment may contain one or more chunks, while a segment may contain one or more fragments. In some embodiments, the chunks may correspond to the smallest used media object, in that it may not contain any other media objects. In the context of low latency, chunks may correspond to the smallest media object addressable by a request related to media data. That is, a request related to media data may request one or more chunks, and chunks may be the smallest media objects that may be requested through a request for media data. For example, a request for media data may request one or more segments, each segment being a larger media object than a chunk in that it may contain one or more chunks. For example, the segments, fragments, and/or chunks that are used in one or more embodiments may have a hierarchical structure, for example in the specific case of CMAF segments, CMAF fragments, and CMAF chunks.

In the present description, the terms "real-time" distribution, distribution "in linear mode", distribution "in linear TV mode", distribution "in dynamic mode" and "live" distribution or distribution "in live mode" are used interchangeably to denote the distribution in live mode or dynamic mode of multimedia content in a content distribution system to terminals, comprising in particular the distribution of the content as it is generated, as opposed to distributing content generated previously, upon an access request from a user (distribution upon an access request or "static" distribution or distribution in static mode), such as for example content recorded on a server and made available to users by a video on demand (VOD) service.

In the present description, the terms "non-linear", "non-linear TV", "non-linear TV mode" "non-linear TV services", "non-linear services" "static distribution", and "distribution in static mode" are used interchangeably to denote the distribution, upon and subject to an access request from a user, of previously generated content, such as for example content recorded on a server and made available to users by a video on demand (VOD) service, a PauseTV service, a Start-Over service, a CatchUp-TV service, a Replay service or a CloudDVR service.

In the present description, the terms "real-time" are also used in the context of video encoding or compressing video content, to denote the encoding or compression of video content at least at the same speed, for example expressed in frames per second, as it is generated by one or more video content sources. For instance, if content is generated at 50 frames per second (fps) it will be deemed encoded in real-time as long as it is also encoded at least 50 fps.

In the present description, the term "live content" refers to content, for example multimedia content, that is distributed, for example using an OTT distribution mode, in dynamic mode (as opposed to the static distribution mode). Live content will typically be generated by a television station, or by any type of television medium, and may also be distributed on a multimedia content broadcast network, in addition to being made available on content servers in an OTT distribution system.

In the present description, the terms "terminal", "user equipment", "reader", "reading device", "reading terminal", "player", and "player device" and "video reader" are used interchangeably to denote any type of device, implemented by one or more items of software, one or more items of hardware, or a combination or one or more items of software and one or more items of hardware, configured so as to use multimedia content distributed in accordance with a distribution protocol, for example a multi-screen distribution protocol, in particular by loading and by reading the content. The terms "client" and "video-reading client" are also used interchangeably to denote any type of device, software and/or hardware, or any function or set of functions, implemented by software and/or hardware within a device and configured so as to use multimedia content distributed in accordance with a distribution protocol, for example a multi-screen distribution protocol, in particular by loading the content from a server and by reading the content.

The terms "network" and "communication network" as used in the present description refer to one or more data links that may couple or connect possibly virtualized equipment so as to allow electronic data to be transported between computer systems and/or modules and/or other devices or electronic equipment, such as between a server and a client device or other types of devices, including between wireless devices that are coupled or connected via a wireless network, for example. A network may also include a mass memory for storing data, such as a NAS (network attached storage), a SAN (storage area network) or any other form of computer-readable or machine-readable medium, for example. A network may comprise, in full or in part, the Internet, one or more local area networks (LAN), one or more wide area networks (WAN), wired connections, wireless connections, cellular connections or any combination of these various networks. Similarly, subnetworks may use various architectures or conform with or be compatible with various protocols, and interoperate with larger networks. Various types of equipment may be used to make various architectures or various protocols interoperable. For example, a router may be used to provide a communication link or a data link between two LANs that would otherwise be separate and independent.

As used herein, the term "pixel" means a picture element or an elementary component of an image, a colour component image, or a (luma or chroma) channel type image, and data corresponding thereto, which may be represented by a numeric value, e.g., a natural integer value. A pixel of a digital image may be coded digitally, and its value may be coded into a bitstream. Further, a pixel of an image may represent image data according to colour spaces, such as the Y, Cb and Cr colour spaces, wherein Y is a luma component of the pixel (also called in the present subject disclosure a luma pixel, a luma sample, or for the sake of simplicity a pixel), and Cb and Cr are the blue-difference and red-difference chroma components of the pixel (also called in the present subject disclosure a chroma pixel, a chroma sample, or for the sake of simplicity a pixel). Two channel types may also be distinguished for a pixel: a luma channel type, corresponding to the luma component of the pixel, and a chroma channel type, jointly designating the chroma components of the pixel. The chroma channel type pixel may itself be divided into the blue-difference (Cb) chroma component and the red-difference (Cr) chroma component. In the following, the term "pixel" may be used to refer, depending on the embodiment and on the image to which it pertains (which may be a YCbCr image, a component image, a chroma component image, a luma component image, etc.), to a pixel of an original image, a luma channel pixel, a chroma channel pixel, a Cb pixel, a Cr pixel, a chroma component pixel, a luma component pixel, a chroma sample, a luma sample, etc.

In the following, the term "plane" may be used to refer to, depending on the embodiment, a color space, a channel type, or a component of the pixel to which all or part of the proposed method may be applied. For example, processing a pixel in the luma plane may correspond to processing a luma component of the pixel (typically associated with a so-called "luminance plane", referred to as the "Y" plane), while processing the pixel in a chroma plane may correspond to processing a chroma component of the pixel (two chrominance planes being generally used and referred to as the "U" and "V" planes, or "Cb" and "Cr" planes). In the following, unless stated otherwise, an operation described as applicable to a pixel may be applied to any pixel component, whether chroma or luma, that is, regardless of whether the pixel represents a luma component or a chroma component of a three-color component pixel. In the following, some embodiments of the proposed methods, apparatuses and computer programs are described for the exemplary processing of pixels of an image in the Y, Cb, and/or Cr planes. However, it will be appreciated by those having ordinary skill in the relevant art that other color spaces, such as, for example, the YUV, Y'CbCr, or RGB color spaces, may be used in place of or in addition to the set of YCbCr color spaces, which is given by way of example only according to embodiments of the present subject disclosure.

Aspects of the methods proposed in the present subject disclosure may advantageously be implemented by any processing node of a multimedia distribution network, or by a video source encoder, or video codec configured for generating a primary media content stream and bootstrap data corresponding to data of the primary media content stream, by encoding images (or frames) of input video data, such as, for example a video encoder and/or codec compliant with any of the Alliance for Open Media (AOM) AV1, H.265/HEVC, MPEG-4 Part 2, SHVC (Scalable HEVC), and H.266/VVC specifications or standards, whether in their existing versions and/or their evolutions, as the case may be adapted for implementing one or more embodiments of the proposed methods.

Video data is generally the subject of source coding aimed at compressing it in order to limit the resources required for its transmission and/or their storage. There are many encoding standards, such as those previously mentioned.

A video sequence may usually comprise a set of images (also called set of frames, or set of pictures). In conventional encoding schemes, the images of the video sequence to be encoded are typically considered according to an encoding sequence, and each is divided into sets of pixels which are also processed sequentially, for example starting at the top left and ending at the bottom. to the right of each image.

In one or more embodiments, an image undergoing processing (e.g. encoding or compression) is typically divided into blocks or coding units (which may also be referred to in some video coding standard specifications as "macroblocks units"), the form and size of which may be determined based on the size of the pixel matrix that corresponds to the image, for example into square-shaped macroblocks of size 16×16 pixels. In VVC and HEVC, the maximum size of a coding unit (CTU) is 128×128 pixels, the coding units of this size being called "Large Coding Units", or "LCU". The AV1 standard also uses a concept similar to the macroblock, and the LCU equivalent is called Super Block, or SB. These blocks can form a set of blocks, corresponding to a partition of the image, for which a processing sequence may be defined that represents the order in which the blocks of the set are to be processed (e.g., encoded or compressed). In the exemplary case of square-shaped blocks of equal sizes, the processing sequence may define a processing order according to which the block located at the leftmost upper corner of the pixel matrix is processed first, followed by the block located immediately to the right of the previous block, until the block at the end of the upper line of blocks (that is, the block located at the rightmost upper corner of the pixel matrix) is processed, followed by the block located at the leftmost on the line immediately below the upper line of blocks, followed by the blocks of this second line processed from left to right, and so on until the block located at the rightmost lower corner of the pixel matrix, which is processed last.

In some embodiments, one or more component images among a luma component image, a first chroma component image and a second chroma component image may be extracted from an input image to be processed. Image data of each component image extracted from the input image may comprise pixel data referred to as "component pixels", and which may also be referred to in the present subject disclosure as "pixels" for the sake of simplicity.

Each of the plurality of component images may then be divided into respective sets of component pixel blocks, and respective processing sequences of the component pixel blocks of the sets of component pixel blocks may be defined for purposes of processing the blocks of the component images according to respective processing sequences.

In some embodiments, the dividing the luma component image, and the first and second chroma component images into blocks may lead to obtaining one or more separate sets of blocks, each set corresponding to a luma and/or a chroma component, such as, for example, a Y component, a Cr component and/or a Cb component, or as another example, a Y component, a U component and/or a V component. Therefore in some embodiments, the dividing a component image (e.g. the luma component image, first and/or second chroma component images) may result in one or more sets of blocks, which blocks corresponding to different component images may possibly be co-located with corresponding blocks in a different component image.

Therefore, in one or more embodiments, each of one or more component images extracted from an image of a video sequence (which, depending on the embodiment, may for example be a YCbCr image, a Y image (luma component image), a Cr and/or Cb chroma component image) may be divided into a plurality of pixel blocks, which may or may not be of equal size or of same shape, for purposes of encoding the component image through encoding of the blocks according to a processing sequence defined based on the partitioning of the component image into blocks. A pixel block may have different sizes depending on the (component) image based on which the partitioning into blocks was performed.

In some embodiments, in particular in the context of video coding, the dividing of an image into blocks may be performed using a partitioning of the image into blocks. For example, a partitioning may divide an image area (whether of square or rectangular shape) into one to four partitions, for example each being of square or rectangular shape.

Therefore in some embodiments a current image, which is divided into blocks according to embodiments of the present subject disclosure, may correspond to a component image (e.g. a luma component image or a chroma component image) extracted from an input image in a set of images (e.g. an input video sequence), and the blocks resulting from the dividing or partitioning of the image may comprise component pixels.

In embodiments in the context of video coding, the encoding of an image of a video sequence may comprise the dividing a matrix of pixels corresponding to an image (which may correspond to a component image extracted from the image to be encoded) into several sets, for example blocks of fixed size 16×16, 32×32, 64×64, or 128×128 and by encoding these blocks of pixels according to a given processing sequence. The processing of a block (or set) of pixels may typically comprise a prediction of pixels of the block, which may be performed using causal pixels, that is, previously encoded pixels of the image being encoded, which is typically referred to as "prediction by spatial correlation", or "intra" prediction, and /, which may lead to the generation of a so-called "I-type" image, or using pixels from previously encoded images, which is typically referred to as "prediction by temporal correlation", or "inter "prediction, which may lead to the generation of a so-called "P-type" image or "B-type" image.

This exploitation of spatial and temporal redundancies makes it possible to avoid transmitting or storing the value of the pixels of each block (or set) of pixels, by calculating for at least some of the blocks a residual of pixels (also called "residual" or "pixel residual") representing a gap, or distance, or difference, between pixels of the block and corresponding pixels of a prediction block determined for the block. Pixel residual data may be present in the data generated by the encoder, and transmitted to the decoder in some embodiments, after transform (for example, of DCT type) and quantization in order to reduce the entropy of the data generated by the encoder.

An image of a video stream (or video sequence) being processed is thus typically divided into blocks of respective shape and size, for example in shaped blocks of 16×16 pixels square. A set of blocks is thus formed for which a processing sequence is defined (also called "processing path"). For example, the blocks of the current image may be processed by starting with the one located at the top left of the image, followed by the one immediately to the right of the previous one, until reaching the end of the first row of blocks to pass to the leftmost block in the row immediately below, to end processing with the lower rightmost block of the image.

Specific intra or inter prediction modes exist: For instance, a specific inter prediction mode sometimes referred to as a "skip" mode may be defined in some video coding standard specifications, as corresponding to the decision not to transmit a pixel residual for a current block which is considered not to have changed compared to its prediction block. The number and names of these specific modes evolve with video coding standards, which may be referred to for further details.

One may therefore consider a so-called "current block," that is, a block being under processing in a current image being processed. In some embodiments, the processing of the current block may include subdividing the current block into sub-blocks, so that the block may be processed with a finer spatial granularity. The processing of a block may also include a predicting of the pixels of the block, using spatial correlations (within the same image) or temporal correlations (in previously processed images) among pixels. In embodiments where a plurality of prediction type may be used, such as an intra prediction, an inter prediction, and/or a skip prediction, implemented in the encoder, the prediction of the block pixels typically includes a selection of a prediction type, and the generation of prediction data that correspond to the selected prediction type, which may form, together with prediction type selection data, a set of encoding parameters.

A video encoder using prediction coding, whether it is spatial prediction coding (e.g. intra prediction) or temporal prediction coding (e.g. inter or skip prediction), will typically include a decoder unit, or pixel reconstruction unit, configured for generating reconstructed pixels, from the reconstructing of pixels that have been encoded, which reconstructed pixels are used for the prediction of pixels of a current block (i.e. pixels of a block being encoded).

In addition to the use of prediction based on macroblocks or CTU (or encoding block), video compression schemes may also use so-called "group of pictures" (or "GOP" or "GoP", which may sometimes be referred to as "group of frames" or "group of images"), to define an order in which the images of a video sequence (or video stream) are arranged. A GOP is typically repeated periodically until the end of encoding. These groups of pictures may comprise several types of images (or pictures), such as type I, type P, and/or type B images as described further below.

FIG. 1a shows an exemplary GOP that may be used by embodiments of the present subject disclosure that use the AV1 video coding standard. The exemplary GOP (10) shown on FIG. 1a comprises images (also referred to as "frames") of respective types of image among the following types:

One or more so-called "Type I" or "I-type" (for "Intra" coded) images (11) are images encoded using only a spatial prediction coding mode, such as the intra prediction mode. This type therefore characterizes an image encoded based only on self-contained information, using spatial correlation prediction instead of temporal correlation prediction. A type I image will typically be used to decode other images of the GOP. A specific subtype is called an IDR (instantaneous Decoding Refresh) image: in this case, frames inside of the GOP cannot refer to frames outside of the GOP. Otherwise, if a type I image is not an IDR image, frames in the (so-called open) GOP can refer to frames outside of it.

One or more so-called "Type P" or "P-type" (for "Predictive" coded) images (12) are images encoded using a temporal prediction coding mode, such as the inter prediction mode, and also possibly other prediction modes, such as the intra prediction mode. Temporal correlation prediction used for encoding a type P image only uses a single image (13) to which the type P image is said to "refer" (or "point") (hence the so-called uni-directional prediction), among images in the GOP that have been encoded prior to the type P image.

One or more so-called "Type B" or "B-type" (for "Bidirectional" coded) images (14) are also images encoded using a temporal prediction coding mode, such as the inter prediction mode, and also possibly other prediction modes, such as the intra prediction mode. In contrast with type P images, temporal correlation prediction used for encoding a type B image may use two images (15 and 16) to which the type B image is said to "refer" (or "point") among images in the GOP that have been encoded prior to the type B image. Rules specifying subsets of images among the ones previously encoded from which each of the two previously encoded images used for encoding the type B image may be selected are typically provided by video coding standard specifications, and may therefore vary according to the video coding standard used in embodiments of the present subject disclosure. In addition, video coding standards may use a different naming convention or a different terminology for the same encoding concept using bi-directional prediction: for instance, the AV1 standard refers to this prediction as "compound" prediction, and B images do not exist per se in the specifications of the AV1 standard.

Figure 1B:
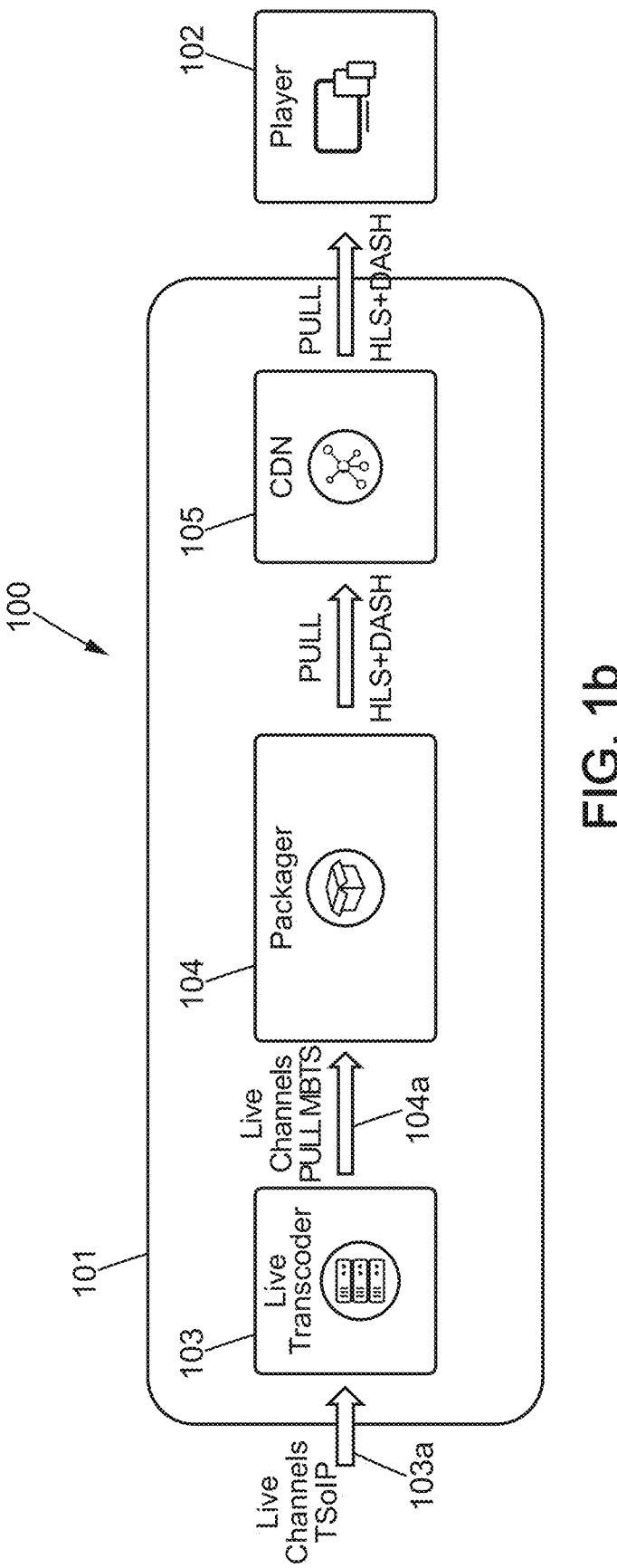
FIG. 1b illustrates an exemplary multimedia content distribution system in accordance with one or more embodiments.

FIG. 1b shows an exemplary multimedia content distribution system according to one or more embodiments of the subject disclosure.

Shown on FIG. 1b is a system 100 comprising multimedia (e.g. video) content distribution subsystem 101 configured to deliver multimedia content to one or more terminals (shown as players 102) at the end of a distribution chain, for example upon request of such players. The subsystem 101 may typically comprise a Live Transcoder subsystem 103 configured for receiving Live Channels 103a as input data, and based on received Live Channels generate source media flows with different quality levels which are output as Live Channels 104a to an Origin/Packager subsystem 104. The Origin/Packager subsystem 104 may typically be configured to receive as input the source media flows and generate OTT content upon request received from a player 102 through a data communication network 105 to which it is connected. The CDN network 105 may be provided in the subsystem 101 as an intermediary between the terminals 102 and the Origin/Packager subsystem 104 configured for serving requests for content originated from the terminals 102. The Origin/Packager subsystem 104 may advantageously also be adapted for implementing one or more embodiments of the proposed methods.

Content received by the Live Transcoder subsystem 103 may be uncompressed or very lightly compressed. For example, the Live Transcoder subsystem 103 may be configured to receive uncompressed video content which may be transported using a data communication link suitable for carrying raw video content, such as an SDI (Serial Digital Interface) link, a TSoIP (Transport Stream over IP) link or a HDMI (High-Definition Multimedia Interface) link. As illustrated in FIG. 1*b*, uncompressed content may be provided to the Live Transcoder subsystem 103 using a TSoIP link. A person of ordinary skill in the art would understand that any type of link suitable for transporting uncompressed or very lightly compressed video content may be used in place of the TSoIP links of FIG. 1*b*, which are provided as an example only.

The Live Transcoder subsystem may be configured for encoding/compressing received channels in live mode, that is, as they are received, and to also output encoded channels in live mode, that is, as they are produced.

As illustrated on FIG. 1*b*, in one or more embodiments the Live Transcoder subsystem 103 comprises one or more transcoding servers, which may comprise one or more encoding and/or transcoding engines, also referred to in the following as source encoders. These one or more servers are preferably configured for encoding content (such as video content and/or audio content) for each "Live Channels" received by the Live Transcoder subsystem 103. In some embodiments the servers may be configured for encoding in real-time different types of content (for example different types of video content) at corresponding transcoding points along the transcoding workflow.

Content output by the Live Transcoder subsystem 103 to the Origin/Packager subsystem 104 may be transported using a data communication link suitable for carrying compressed video content, such as for example a Multi Bitrate Transport Stream (MBTS) link as illustrated on FIG. 1*b*. In one or more embodiments, the media stream output to the Origin/Packager subsystem 104 may be a media stream supporting low-latency, that is, a media stream which is configured for use in media distribution systems supporting low-latency. Such a media stream may carry information indicating a chunk structure, in addition to carrying information indicating a fragment structure, and/or a segment structure in addition to carrying media data.

In one or more embodiments, the data communication network 105 may be a Content Distribution Network or a Content Delivery Network (CDN).

A person of ordinary skill in the art would understand that any type of network suitable for providing fast delivery of Internet content, such as video content, may be used in place of the CDN 105 of FIG. 1*b*, which is provided as an example only, and that any format suitable for transmission of multimedia content, such as video content, with very low latency, may be used, such as the CMAF (Control Media Application Format) format, which is provided as an example only. Using a CDN advantageously allows leveraging the existing CDN infrastructure, whether public or private, for data communication between the Origin/Packager 104 of the system and the terminal 102 (which may for example be a player embedded in a computer, a smartphone or a tablet at a users' site).

A "pull"-type data communication mechanism may typically be used for data communication between the Live Transcoder 103 and the Origin/Packager 104, and between the terminal 102 and the Origin/Packager 104 through the CDN 105, according to which the Origin/Packager 104 (respectively the terminal 102) may request data from the Live Transcoder 103 (respectively the Origin/Packager 104) as it is ready to receive such data (through the CDN for the terminal 102). In this case, data communication would be guided by the Origin/Packager 104 (respectively the terminal 102) instead of the Live Transcoder 103 (respectively the Origin/Packager 104).

The Origin/Packager 104 may typically be configured for generating files suitable for corresponding media transport protocols and readable by the terminal which requested the content. In an OTT distribution system, content generated by the packager may be referred to as OTT content, that is, content that may be distributed to terminals using data communication mechanisms used in OTT distribution, such as the HLS protocol, the MSS protocol, the HDS protocol and the MPEG DASH protocol.

Standard OTT packaging operates by generating and publishing as soon as possible, that is without waiting for a request for content, all contents for all OTT protocols.

In contrast, "just-in-time" OTT packaging (sometimes also referred to as "on-the-fly" packaging) operates asynchronously, by generating and publishing content only upon and subject to receiving a request for such content.

In one or more embodiments, the data communication between the Transcoder 103 and the Packager 104 may use a low latency data communication mechanism, such as for example provided by the CMAF data communication mechanism. The CMAF mechanism provides a container format and a specific means for formatting and packaging audio/video content which allows transmission of audio/video content with low latency (between the time content is received at the Transcoder 103 and the time such content is displayed at a terminal 102). Content formatted according to the CMAF may advantageously be transferred over IP-based communication network and IP-based communication links. Low latency is achieved because CMAF formatted content can be transferred in smaller data units, called chunks (atomic units) as compared to other, traditional formats. According to traditional formats, a segmentation structure in fragment units is typically used, whereas in formats supporting low latency, a segmentation structure in chunk units that are smaller in size than fragment units may be used, so that in systems supporting low latency a fragment may carry one or more chunks. As an example, the streaming latency for encoding, distributing, decoding and displaying video content is typically in the order of 30 seconds or more. When using the proposed low latency data communication mechanisms (such as CMAF), a reduced latency for encoding, distributing, decoding and displaying video content of approximately 3-5 seconds may be achieved. A person of ordinary skill in the art would understand that other suitable formats providing low-latency data communication of video content, such as Low Latency HTTP Live Streaming (LL HLS), in its current or future versions, may be used in place or as a complement of CMAF, in its current or future versions, which is given only as an example.

The Packager 104 may in one or more embodiments be configured for receiving data outputted by the Transcoder 103 and formatted using the CMAF low latency data communication mechanism.

In one or more embodiments, uncompressed and/or lightly compressed content may be encoded using advanced video compression standards (such as, but not limited to, HEVC, AV1 or VVC, or typically any video compression scheme which performs a bitrate compression by a factor of 100 or more as compared to a SDI bitrate) to minimize bandwidth requirements while maintaining a high quality for the video. Similarly, audio content, such as corresponding to audio accompanying the video content, may be compressed using advanced audio codecs such as, but not limited to, HE-AAC or AC-4.

One of the challenges addressed by linear services distribution systems in OTT networks relates to offering an optimum quality of experience while limiting the weight of video data on the networks, and ensuring minimum zapping time and latency.

Depending on the embodiment, the zapping time may correspond to the time duration (for instance experienced at the player device), between the time of a zapping request (e.g. the time of receipt or service of the zapping request) in relation with a user instruction to watch a new channel (which may be referred to, in the following, as the "target channel"), and the time at which the player device starts using data of the media content stream corresponding to the target channel (e.g. the time at which the player device starts downloading, decoding and/or playing such data).

Depending on the embodiment, the latency may correspond to the time duration between the time at which data (e.g. the first chunk of a segment) of the media content stream selected to be played at the player device is available to be downloaded (if applicable), decoded, and/or played, and the time of actually downloading (if applicable), decoding and/or playing at the player such data. In other words, the latency may be seen as a measurement of the time duration between a time at which multimedia data is available to be used by a player, and the time at which the player actually uses such multimedia data.

For OTT networks, techniques have been developed to reduce the zapping time and the latency. However such techniques present several drawbacks:

OTT distribution schemes rely on a file-based approach, according to which the encoder generates a file which is transmitted to a storing server once the encoding of the file is completed. The latency is therefore increased as compared to a flow-based approach whereby the video output is delivered continuously, as the multimedia (e.g. video) data is not delivered continuously but on a per-encoded file basis.

In order to tackle this issue, low-latency techniques have been developed, as described above, according to which each multimedia file corresponding to a segment is transmitted once encoded, and therefore published, by fragments that a player can start decoding and playing before encoding of the segment is completed.

Figure 2A:
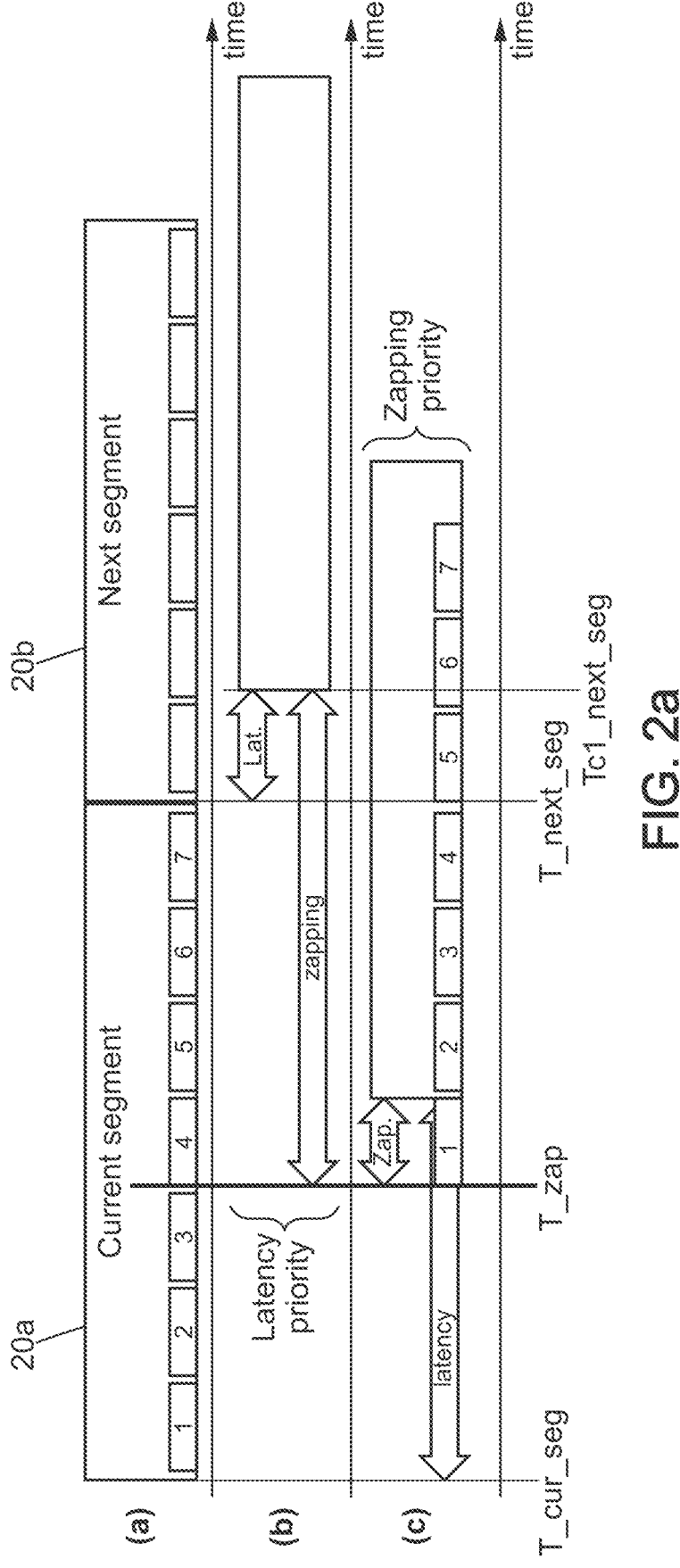
FIG. 2a illustrates strategies that a player may use to serve a zapping request in an OTT multimedia distribution system.
Figure 2B:
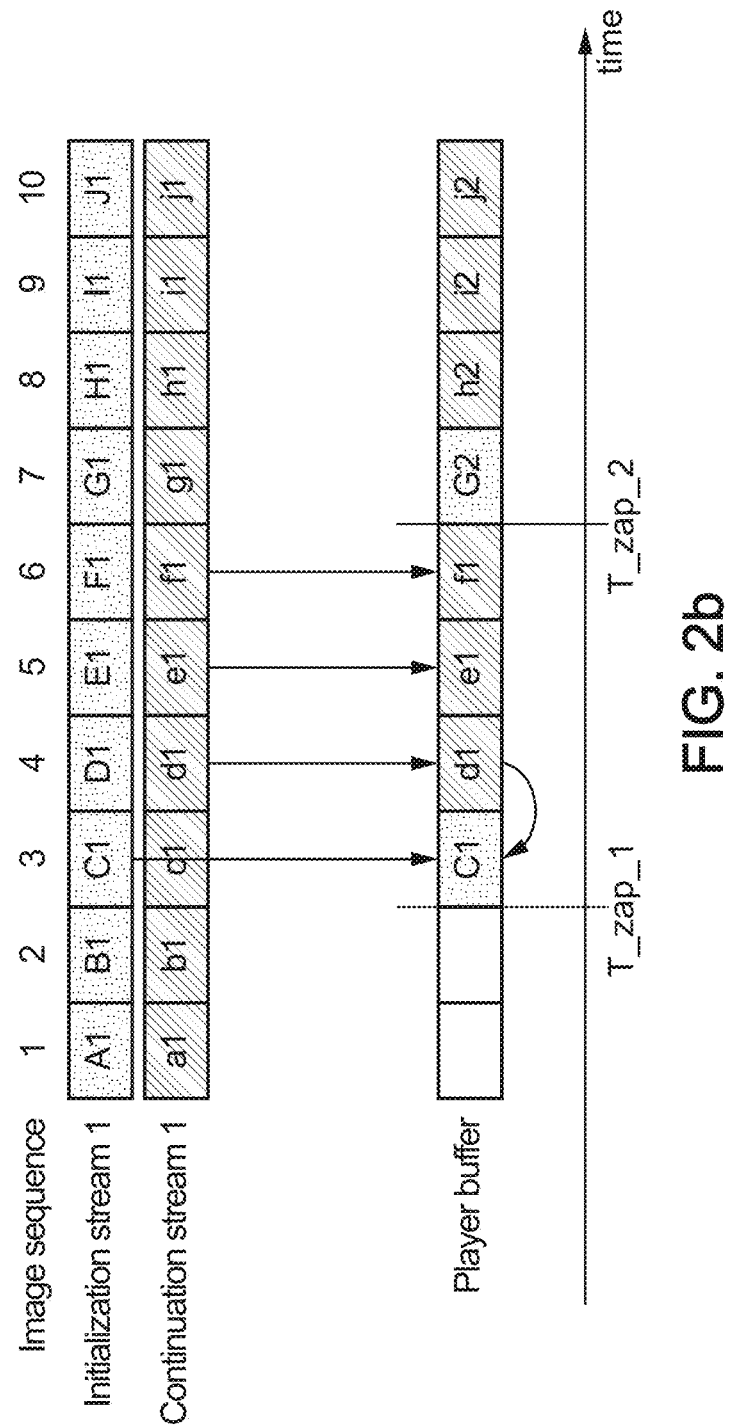
FIG. 2b illustrates the distribution of multimedia data according to the HESP protocol.

Examples of strategies used by players to achieve either low latency or low zapping time in an OTT multimedia distribution system are illustrated in FIGS. 2a and 2b.

FIG. 2a shows a first example of strategies that a player may use to serve a zapping request.

As shown on FIG. 2a, an OTT multimedia distribution system may be configured to distribute to players, through a server, segments in a sequence, each of the segments comprising a plurality of N chunks (for example 7 chunks as illustrated).

Shown on FIG. 2a(a) are two segments corresponding to a channel identified in a zapping request, among which a first segment 20a which may be referred to in the following as the "current segment", and a second segment 20b, immediately following the current segment, which may be referred to in the following as the "next segment". The current segment 20a is distributed by the server, that is, the first chunk of the current segment is made available by the server, as of a time T_cur_seg, while the next segment is distributed by the server, that is, the first chunk of the next segment is made available by the server, as of a time T_next_seg, that typically corresponds to the sum of T_cur_seg and the duration of the current segment.

As illustrated, the current segment may comprise a sequence of N chunks (e.g. N=7), indexed 1 to N according to an order in which they are made available by the server (chunk #1 being the first chunk of the current segment being made available, while chunk #N being the last chunk of the current segment being made available). The player may be configured to start decoding chunks of the current segment and playing the corresponding multimedia content as they are received.

As shown in FIG. 2a, a zapping request for playing the channel may occur after T_cur_seg, and may be served at a time T_zap, which corresponds to a time at which the first three chunks of the current segment have already been made available by the server.

According to a first strategy (so-called "latency priority") illustrated by FIG. 2a(b), the player may decide to wait until the next segment is available, that is, until the time Tc1_next_seg at which at least the first chunk of the next segment is available for download. As illustrated, with a zapping request that occurs after the first three chunks of the current segment have already been made available, the player may have to wait for a time period corresponding to the last 4 chunks of the current segment in order to start downloading and decoding data corresponding to the channel as of the time data of the next segment is made available. In such case, the player may decide to wait until the time after T_next_seg at which the first chunk of the next segment is available for download and decoding, so that the player may start to play the first chunk of the next segment once downloaded and decoded.

Therefore according to the first strategy, the player may disregard the remaining chunks of the current segment that may be available to download, decode, and play, and may wait for the publication of the next segment corresponding to the channel to start downloading, decoding and playing chunks of the next segment of the new channel as quickly as possible once they are published (available for download). The latency, which corresponds to the time duration between the time the first chunk of a segment is available to download, and the time of actually downloading, decoding and/or playing at the player the video of the first chunk of the segment, is therefore reduced, but the zapping time (which corresponds to the time duration between the time of receipt of the zapping request and the time of decoding and playing the video of the first chunk of a segment of the target channel) is thereby increased in situations such as illustrated on FIG. 2a(b).

Therefore according to this first exemplary strategy, the player may prioritize a short latency potentially at the expense of a long zapping time.

According to a second strategy (so-called "zapping priority") illustrated by FIG. 2a(c), the player may decide to download chunks of a segment of the multimedia stream corresponding to the channel as soon as possible, without regard to whether these chunks correspond to a segment of which chunks were already available at the zapping time T_zap. That is, the player may decide not to wait until the next segment is available, so as to start downloading the data of the first chunk of the next available segment of the multimedia stream corresponding to the channel, and not wait until the time Tc1_next_seg at which at least the first chunk of the next segment is available for download. As illustrated, with a zapping request that occurs after the first three chunks of the current segment have already been made available, the player may start downloading and decoding the chunks of the current segment that are available, that is, the first three chunks of the current segment, and play the current segment of the channel starting from the first chunk thereof as soon as possible after receipt of the zapping request.

Therefore according to the first strategy, the player may prioritize downloading, decoding and playing the chunks of the current segment, in order to start downloading, decoding and playing chunks of whichever segment of the target channel is available as quickly as possible after the zapping request is received. Unlike the first strategy, the zapping time (which corresponds to the time duration between the time of receipt of the zapping request and the time of decoding and playing the video of the first chunk of a segment of the target channel) is therefore reduced, but the latency, which corresponds to the time duration between the time the first chunk of a segment is available to download, and the time of actually downloading, decoding and/or playing at the player the video of the first chunk of the segment is thereby increased in situations such as illustrated on FIG. 2a(c).

Therefore according to this second exemplary strategy, the player may prioritize a short zapping time potentially at the expense of a long latency.

The two exemplary strategies illustrated by FIG. 2a show that in OTT multimedia distribution systems, either a latency priority-based approach or a zapping priority-based approach may be used, with none of these two approaches providing both a low latency and a low zapping. As exemplified by the first and second exemplary strategies illustrated by FIG. 2a, the player may implement a strategy that either prioritizes a short latency at the expense of a longer zapping time or prioritizes a short zapping time at the expense of a longer latency. As a consequence, strategies that may be implemented with low latency chunks in OTT distribution systems cannot achieve both a low latency and a low zapping time.

Other protocols, such as the High Efficiency Streaming Protocol (HESP) have been developed that may be used to obtain both a low latency and a low zapping time, however at the expense of several drawbacks.

FIG. 2b illustrates the distribution of multimedia data according to the HESP protocol.

As illustrated by FIG. 2b, HESP uses two media content streams, a first media content stream (so-called "initialization stream") and a second media content stream (so-called "continuation stream"), in a complementary manner.

The multimedia distribution system implementing the HESP protocol is configured to produce the initialization stream and the continuation stream in time synchronization with each other.

For example, with respect to an exemplary sequence of images numbered 1 to 10 as shown on FIG. 2b, the system is configured to generate the two streams by encoding each image of the sequence with different encoding parameters. All of the images of the initialization stream are encoded as I-frames, so that the initialization stream may be viewed as an all-Intra stream comprising a sequence of Intra-coded images (IIIII . . . ) (in the example of FIG. 2b, I-frames A1, B1, C1, D1, E1, F1, G1, H1, I1, and J1). Images of the continuation stream are encoded according to a so-called "Low-Delay P" structure, in which the first image of the sequence is encoded as I-frame, and the following images are encoded as P-frames.

Accordingly, a player device wanting to serve a zapping request to play the sequence of images received at T_zap may directly download the first available I-frame from the initialization stream, in order to be able to start decoding as soon as possible after T_zap images from the sequence (in the example illustrated by FIG. 2b the player may download from the initialization stream and start decoding the I-frame C1). Once it has obtained a first self-decodable image from the sequence, the player may switch to the continuation stream in order to download and decode following images of the sequence (in the example illustrated by FIG. 2b the player may download from the continuation stream and start decoding the P-frames d1, e1, and f1). As the image first downloaded from the initialization stream is an I-frame, it can be decoded without using other images of the sequence. The next downloaded images may require previously decoded images of the sequence, which is not an issue given that the first downloaded image of the sequence was an I-frame and was decoded as such. For example, as illustrated on FIG. 2b, P-frame d1 may be decoded using decoded C1 I-frame.

Therefore, the player does not need to wait for the next available I-frame of the sequence of images, and thanks to the initialization stream can download as quickly as possible upon receiving the zapping request the first I-frame which is immediately available from the initialization stream. As a consequence, the player can start decoding images of the sequence of images promptly after receiving the zapping request, thanks to the initialization stream, and then continue decoding the images of the sequence based on the continuation stream.

Such a direct access to the images of the sequence provides a low zapping time as well as a low latency.

A first drawback of HESP is that it requires using a GoP structure which is not efficient in terms of compression, and which has several constraints on the encoding of images in order to limit the occurrence of a drift. As a consequence, HESP comes with severe constraints on the encoding, with no possibility to optimize GoPs or the encoding scheme.

Another drawback of HESP is that HESP is not transparent for the player, as it requires implementation of specific proprietary packaging formats and distribution protocols.

Yet another drawback of HESP is that the backup flow is highly bandwidth consuming, so that it potentially may generate a several visual drift for the user.

The proposed scheme advantageously mitigates these drawbacks, while still offering a service access with low latency and low zapping time.

Figure 3:
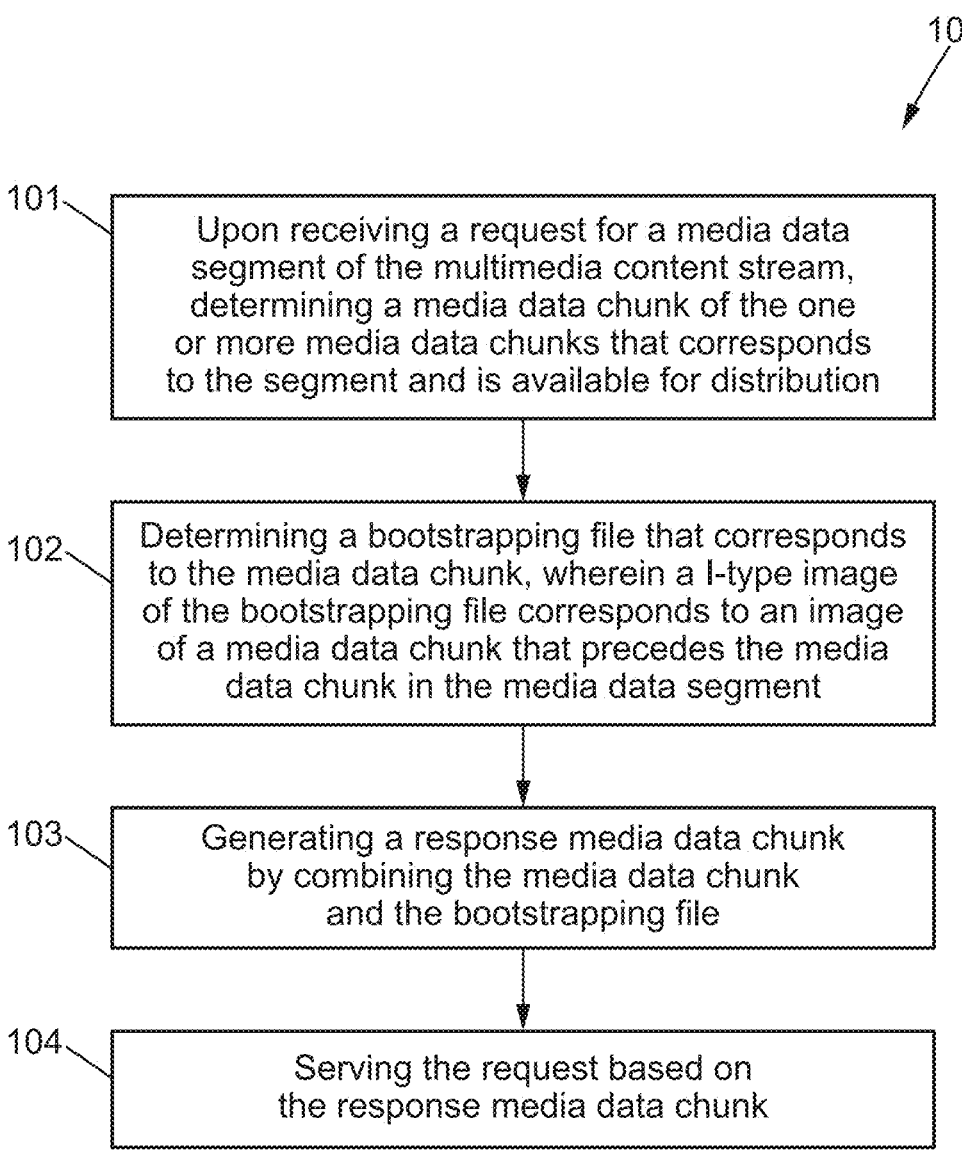
FIG. 3 is a block diagram of an exemplary method of processing a media content stream in accordance with one or more embodiments.

FIG. 3 illustrates an exemplary method (100) of processing a media content stream in accordance with one or more embodiments.

In some embodiments, the proposed method may be implemented in a media distribution unit of a video distribution network, the media distribution unit comprising a processor and a memory configured for storing media data. The memory may be configured to store one or more media data chunks of the media content stream received by the media distribution unit, and may be further configured to store one or more bootstrapping files respectively corresponding to the one or more media data chunks.

Upon receiving, for example from a video player, a request for a media data segment of the media content stream, a media data chunk of the one or more media data chunks that corresponds to the segment and is available for distribution may be determined (101).

In some embodiments, the request may originate from a video player or a user device, and may be received by the media distribution unit through one or more nodes of the video distribution network.

The request may take the form of a message according to any suitable protocol, such as a HyperText Transfer Protocol (HTTP) "GET" request message.

In some embodiments, the request may correspond to an initial request for multimedia data initiated by a video player which is not already playing a first video channel corresponding to a first media content stream.

In other embodiments, the request may correspond to a zapping request initiated by a video player which is already playing a first video channel corresponding to a first media content stream, the request being for data of a second media content stream corresponding to a second channel. In such embodiments, the request may comprise a request from a player for switching from receiving previous channel data corresponding to a previous media content stream to receiving new channel data corresponding to the media content stream.

The memory used by the media distribution unit may be configured to store one or more media data chunks of the media content stream requested in the request received by the media distribution unit. Pluralities of the media data chunks of the media content stream may form segments of the media content stream, each segment comprising a plurality of media data chunks.

The memory used by the media distribution unit may further be configured to store one or more bootstrapping file respectively corresponding to the one or more media data chunks, each of the one or more bootstrapping files comprising each of the one or more bootstrapping files comprising a respective sequence of one or more images starting with an I-type encoded image. Therefore, for a given chunk of the one or more chunks of the media content stream, the memory may also store bootstrapping data that comprise a sequence of one or more images starting with an I-type encoded image. Such bootstrapping data may advantageously be used by a video player to start playing video data of the media content stream as soon as they are made available to the video player.

In some embodiments, the media distribution unit may be configured for determining (102) a bootstrapping file corresponding to the determined media data chunk.

In one or more embodiments, the bootstrapping file may be determined as corresponding to the determined media data chunk, for example in that the I-type image of the bootstrapping file corresponds to an image of a media data chunk that (e.g. immediately) precedes the media data chunk in the media data segment. For example, the I-type image of the bootstrapping file and its corresponding image in the media data chunk may correspond to image data that has been encoded to produce an I-type image for the bootstrapping file, and to produce image encoded differently from an I-type image (e.g. a B-type image or a P-type image) for the media data chunk.

Based on the correspondence between the bootstrapping data of the media content stream, and data of the media content stream, the video player may advantageously use the bootstrapping data to start playing data of the media content stream with a zapping time and a latency that are both reduced.

Depending on the embodiment, each bootstrapping file may comprise a sequence of one or more images starting with an I-type image, and possibly further comprising one or more of a P-type image and a B-type image. Therefore, three types of bootstrapping image sequence may be used: a so-called "I-type" bootstrapping sequence that starts with an I-type image and may not comprise any P-type or B-type image, a so-called "I+P" bootstrapping sequence that starts with an I-type image and further comprises a P-type image, and a so-called "I+B" bootstrapping sequence that starts with an I-type image and further comprises a B-type image. Depending on the embodiment, one or more of the I-type bootstrapping sequence, I+P bootstrapping sequence, and I+B bootstrapping sequence may be used in respective bootstrapping files for implementing the proposed method according to embodiments of the present subject disclosure. In some embodiments, the bootstrapping sequence may be an I+B type bootstrapping sequence in cases where the media data chunk that (e.g. immediately) precedes the media data chunk in the media data segment ends with a B-type image, the bootstrapping sequence may be an I+P type bootstrapping sequence in cases where the media data chunk that (e.g. immediately) precedes the media data chunk in the media data segment ends with a P-type image, and the bootstrapping sequence may be an I-type bootstrapping sequence in cases where the media data chunk that (e.g. immediately) precedes the media data chunk in the media data segment ends with an I-type image.

In some embodiments, the media distribution unit may further be configured to generate (103) a so-called "response" media data chunk to be used for responding to the request, by combining the media data chunk and the bootstrapping file.

The response media data chunk may advantageously be generated by the media distribution unit so as to be usable by a video player for playing video data of the media content stream.

In some embodiments, the media distribution unit may further be configured to serve (104) the request based on the response media data chunk, for example by sending the response media data chunk to a video player so that the video player may start playing data of the media content stream with reduced latency and reduced zapping time in cases where the request is a zapping request.

In one or more embodiments, the request may be a zapping request, that is, a request from a player for switching from receiving previous channel data corresponding to a previous media content stream, to receiving new channel data corresponding to the media content stream.

In one or more embodiments, the determination of the media data chunk based on the received request and the determined reception time may comprise: obtaining timestamp information of the media data chunk and selecting the media data chunk among the one or more media data chunks based on the timestamp information.

For example, in some embodiments, respective timestamp information may be obtained for one or more of the media data chunks, and the media data chunk may be selected among the plurality of media data chunks of the media content stream based on the timestamp information of the selected media data chunk.

In some embodiments, the multimedia distribution unit may be configured to determine a reception time of the request, and the media data chunk may be selected among the plurality of media data chunks of the media content stream based on one or more of the reception time and the timestamp information of the selected media data chunk.

For example, the media data chunk may be selected among the plurality of media data chunks of the media content stream requested by the request based on a comparison of the timestamp information of the media data chunk and a reception time of the request. In some embodiments, the media data chunk may be selected by selecting a media data chunk corresponding in time to the reception time, for example by selecting the media data chunk with a time offset between the timestamp information and the reception time being below a predetermined threshold.

In one or more embodiments, the media data chunk may be selected among the plurality of media data chunks of the media content stream requested by the request as the first available chunk among the plurality of media data chunks of the media content stream requested by the request which is available for distribution.

In some embodiments, the media data chunk may be chosen among a plurality of media data chunks of the media content stream requested by the request which are available for distribution.

In some embodiments, the media data chunk may be chosen among a plurality of media data chunks of the media content stream requested by the request which are available for distribution as the first available media data chunk for distribution.

In one or more embodiments, the media content stream may comprise a first, so-called "primary" (or, indifferently in the present subject disclosure, "main") media content stream, and a second, so-called "secondary" media content stream, with the primary media content stream comprising the one or more media data chunks, and the secondary media content stream comprising the one or more bootstrapping files corresponding to the one or more media data chunks of the primary media content stream. In such embodiments, the media distribution unit may be provided with a pair of media content streams, comprising a primary media content stream comprising media data chunk of the media content stream, e.g. as generated by a video encoder, and a secondary media content stream comprising respective bootstrapping data corresponding to one or more of the media data chunk of the primary media content stream.

For example, in some embodiments, the primary media content stream may be generated in a conventional manner, and once generated may comprise a sequence of segments, each comprising a plurality of media data chunks, and the secondary media content stream may be generated by generating bootstrap data for one or more, or depending on the embodiment, each of the media data chunks of the primary media content stream.

In some embodiments, the media data chunk that is selected, for example in the primary media content stream, based on the request (media content stream identified in the request) may not comprise any I-type image, so that if provided to a video player as a response to the request, would not contain any image that can be decoded by the video player. In other words, such a media data chunk would lack bootstrap data that can be used by the video player to start decoding images of the media content stream. As a consequence, the video player would need to wait for the first media data chunk of the media content stream that can be decoded autonomously, thereby increasing the latency as well as the zapping time as the case may be. The present subject disclosure advantageously provides bootstrap data that can allow the video player to start decoding and playing data of the media content stream through the generation of a response media data chunk by combining data of the selected media data chunk and bootstrap data corresponding to such selected media data chunk, and the serving the request based on the generated response media data chunk.

Figure 4A:
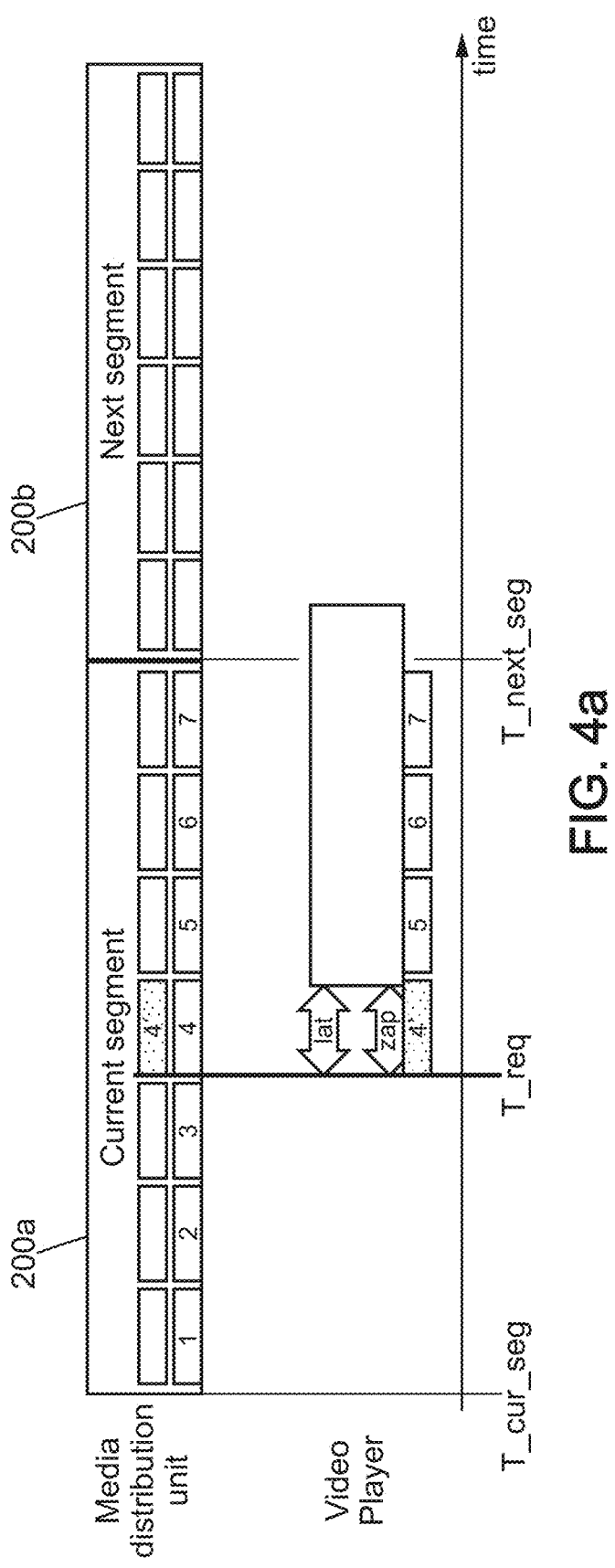
FIG. 4a illustrates an exemplary method for processing a media content stream in an OTT multimedia distribution system in accordance with one or more embodiments.

FIG. 4a illustrates operations of the proposed method in an exemplary OTT multimedia distribution system according to one or more embodiments of the present subject disclosure.

As shown on FIG. 4a, an OTT multimedia distribution system may be configured to distribute to one or more video players, through one or more servers of a video distribution network, segments in a sequence, each of the segments comprising a plurality of N chunks (for example 7 chunks as illustrated).

Shown on FIG. 4a are two segments corresponding to a channel, for example identified in a zapping request, among which a first segment 200a which may be referred to in the following as the "current segment", and a second segment 200b, immediately following the current segment, which may be referred to in the following as the "next segment". The segments of the channel, including the current segment 200a and the next segment 200b, may be distributed by a media distribution unit configured for implementing a proposed method according to the present subject disclosure. The current segment 200a is distributed by the media distribution unit, that is, the first chunk of the current segment is made available by the media distribution unit, as of a time T_cur_seg, while the next segment is distributed by the media distribution unit, that is, the first chunk of the next segment is made available by the media distribution unit, as of a time T_next_seg, that typically corresponds to the sum of T_cur_seg and the duration of the current segment.

As illustrated, the current segment may comprise a sequence of N chunks (e.g. N=7), indexed 1 to N according to an order in which they are made available by the server (chunk #1 being the first chunk of the current segment being made available, while chunk #N being the last chunk of the current segment being made available). The player may be configured to start decoding chunks of the current segment and playing the corresponding multimedia content as they are received.

As shown in FIG. 4a, the current segment may further comprise bootstrap data respectively corresponding to the chunks (1, 2, 3, 4, 5, 6, and 7) of the current segment 200a, and each chunk of the current segment 200a is received by the media distribution unit together with its corresponding bootstrap data.

A request (e.g. a zapping request) for data of the channel may be received by the media distribution unit after T_cur_seg, and may be served at a time T_req, which corresponds to a time at which the first three chunks of the current segment have already been made available by the media distribution unit.

In one or more embodiments, upon receipt of the request, the media distribution unit may determine that the fourth chunk (4) of the current segment 200a is available for serving the request, and fetch from memory received bootstrapping data that corresponds to the fourth chunk (4) of the current segment 200a.

In some embodiments, upon receipt of the request, the media distribution unit may further determine a reception time of the request, for example based on a local clock, and may determine, based on the received request, for example by parsing the request, that the request is directed to the channel corresponding to the current segment 200a. The media distribution unit may also determine that the fourth chunk (4) of the current segment 200*a* is available for serving the request based on the reception time of the request.

The bootstrapping data that corresponds to the fourth chunk (4) may comprise a sequence of one or more images which starts with an I-type encoded image which may correspond to an image of a chunk (e.g. the third chunk (3) of the current segment (200*a*)) which precedes the fourth chunk (4) in the current segment 200*a*. The media distribution unit may then generate a response media data chunk (4') intended to be used in place of the fourth chunk (4) by combining data of the fourth chunk (4) and its corresponding bootstrapping data. The response media data chunk (4') may be built to incorporate bootstrap data corresponding to the chunk (4) so that it may be used by a video player upon receipt for decoding and playing data of the current segment, therefore with a reduced latency, and also zapping time (in cases where the request is a channel zapping request). The present subject disclosure therefore provides a scheme which alleviates the need for a compromise by either selecting a short latency at the expense of zapping time or selecting a short zapping time at the expense of latency as illustrated by FIG. 2*a*.

In some embodiments, the media distribution unit may generate the response chunk (4'), and may serve the request based on the response chunk (4'), for example by sending the response chunk to the network node originator of the request (e.g. a video player originator of the request).

As shown in FIG. 4*a*, once the video player has been provided with the response chunk that was built with bootstrap data, the video player may be provided with following chunks and segments of the channel, including chunks 5, 6, and 7 of the current segment (200*a*), even though such chunks may not comprise data that can be used for starting decoding data of the current segment (200*a*).

Thanks to the response chunk (4') which is built using bootstrap data, the decoding of chunks of the current segment corresponding to the requested channel can be initiated with reduced latency and reduced zapping time when the request is a zapping request.

Further, in contrast with the HESP, the proposed scheme does not require an initialization stream, as the bootstrap data that is provided to the multimedia distribution unit for each chunk of a media content stream does not constitute a secondary stream. This advantageously reduces use of bandwidth resource in the video distribution network as compared to the HESP scheme, and avoids constraints associated with the low-delay encoding structure imposed by the HESP scheme. For example, the compression efficiency that is exploited in OTT distribution networks, which is critical for live broadcasting, can advantageously be maintained.

In some embodiments, the bootstrap data associated with each chunk may advantageously be much slimer than would be a chunk of an initialization stream corresponding to a chunk of a continuation stream according to HESP, so that it may be used to initialize the decoding of chunks of the media content stream corresponding to the requested channel. Indeed, depending on the embodiment, the bootstrap data associated with each chunk may comprise a respective type-I encoded image (in which case the bootstrap data may not comprise a type-P encoded image or a type-B encoded image), a respective I-type encoded image and a respective P-type encoded image that refers to the respective I-type encoded image, or a respective I-type encoded image and a respective B-type encoded image that refers to the respective I-type encoded image. The proposed scheme can therefore advantageously preserve compatibility with the GoP structures that are typically used in OTT distribution. Thanks to the proposed scheme, the video player can start decoding the chunks of the current segment based on the chunk that is first delivered in response to the request, as this first chunk will have been built based on a chunk of the media content stream and bootstrapping data corresponding to this chunk.

Figure 4B:
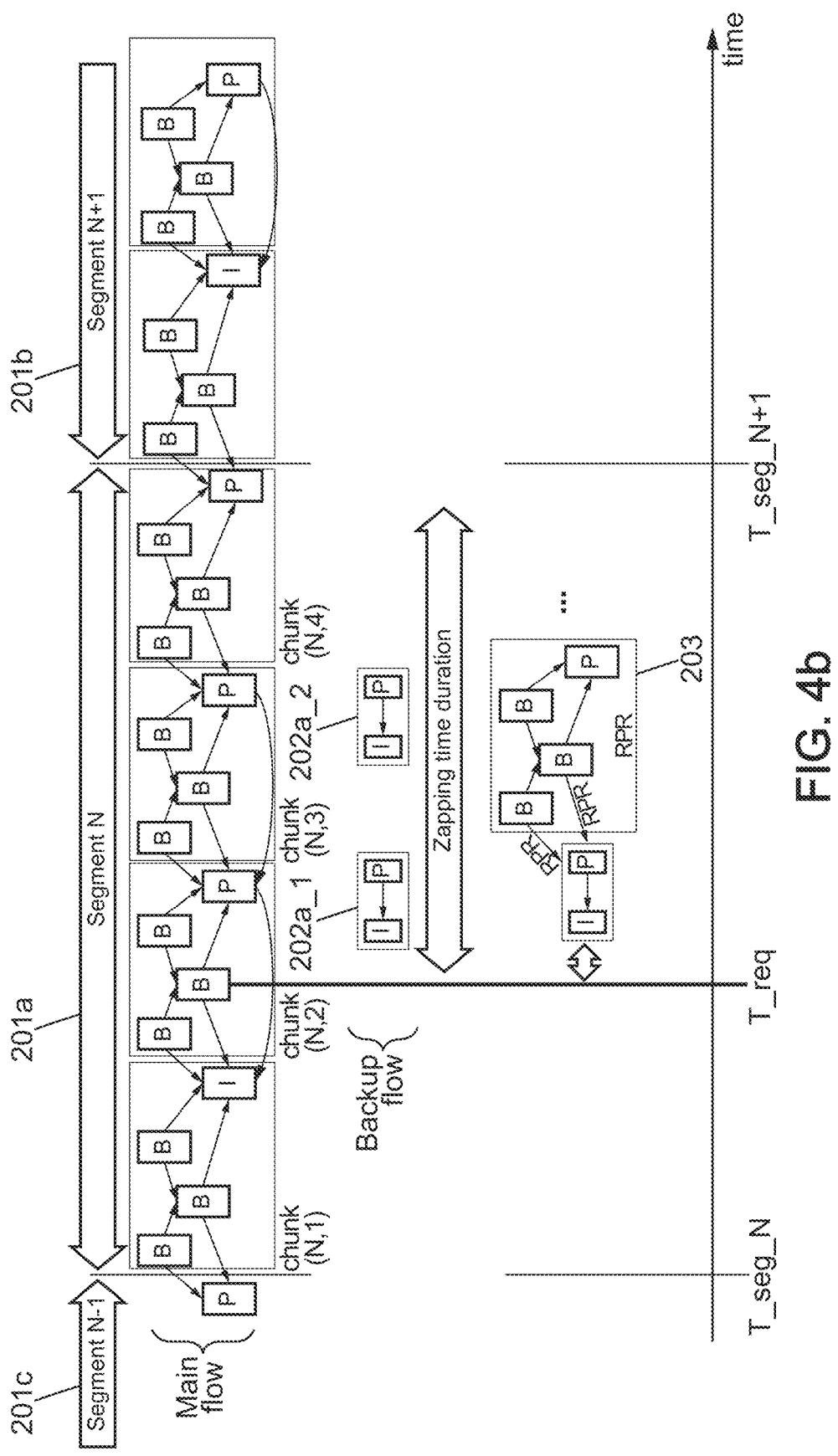
FIG. 4b illustrates an exemplary method for processing a media content stream in an OTT multimedia distribution system in accordance with one or more embodiments.

FIG. 4*b* illustrates operations of the proposed method in an exemplary OTT multimedia distribution system according to one or more embodiments of the present subject disclosure.

As shown on FIG. 4*b*, an OTT multimedia distribution system may be configured to distribute to one or more video players, through one or more servers of a video distribution network, segments in a sequence, each of the segments comprising a plurality of N chunks.

Shown on FIG. 4*b* are three segments of a sequence of segments of a media content stream ("main flow" on the figure) corresponding to a channel, for example identified in a request (e.g. a zapping request), among which a segment N−1 (201*c*), a segment N (201*a*), and a segment N+1 (201*b*), with the segment N (201*a*) immediately following the segment N−1 (201*c*), and the segment N+1 (201*b*) immediately following the segment N (201*a*). The segments of the channel, including the current segment N−1 (201*c*), the segment N (201*a*), and the segment N+1 (201*b*), may be distributed by a media distribution unit configured for implementing a proposed method according to the present subject disclosure. The current segment (201*a*) is distributed by the media distribution unit, that is, the first chunk of the current segment is made available by the media distribution unit, as of a time T_seg_N, while the next segment is distributed by the media distribution unit, that is, the first chunk of the next segment is made available by the media distribution unit, as of a time T_seg_N+1, that typically corresponds to the sum of T_seg_N and the duration of the current segment.

As shown in FIG. 4*b*, exemplary segment N (201*a*) comprises an exemplary number of four chunks: chunk(N, 1), chunk(N,2), chunk(N,3), and chunk(N,4). The first chunk comprises 3 B-Type images and one I-Type image, and the other chunks each comprise 3 B-Type images and one P-type image. Therefore, among the chunks of the segment N (201*a*), only the first one (chunk(N,1)) includes an I-Type image which can be used for initiating decoding of data of the media content stream.

Also shown in FIG. 4*b* are sets of bootstrapping data 202*a*_1 and 202*a*_2 that each comprise an I-Type image and a P-Type image referring to the I-Type image, that constitute the bootstrapping data of respectively corresponding chunks of the segment N (201*a*) and are distributed to the media distribution unit as part of a so-called "backup flow".

A request (e.g. a zapping request) for data of the channel may be received by the media distribution unit after T_seg_N, and may be served at a time T_req, which corresponds to a time at which the first chunk chunk(N,1) of the segment N (201*a*) has already been made available by the media distribution unit.

In one or more embodiments, upon receipt of the request, the media distribution unit may determine the third chunk (chunk(N,3)) of segment N (201*a*) as the first chunk of segment N that can be used for serving the request.

As the third chunk (chunk(N,3)) cannot be delivered as such as it contains at least one image that refers to another image of the preceding chunk (chunk(N,2)), the media distribution unit may therefore generate a new chunk based on data of the third chunk (chunk(N,3)), and bootstrapping data corresponding to the third chunk (chunk(N,3)). The bootstrapping data (202*a*_2) that corresponds to the third chunk (chunk(N,3)) may comprise a sequence of one or more images which starts with an I-type encoded image which may correspond to an image of a chunk (e.g. the second chunk (chunk (N,2)) which precedes the third chunk (chunk(N,3)) in the current segment 201a. As illustrated by FIG. 4b, in some embodiments, the sequence of images of the bootstrapping data (202a_2) that corresponds to the third chunk (chunk(N,3)) may comprise, in addition to the I-type encoded image, a P-type encoded image that refers to the I-type encoded image.

In some embodiments, upon receipt of the request, the media distribution unit may further determine a reception time of the request, for example based on a local clock, and may determine, based on the received request, for example by parsing the request, that the request is directed to the channel corresponding to the media content stream of which segment N is being made available. The media distribution unit may then determine the third chunk (chunk(N,3)) of segment N (201a) as the first chunk of segment N that can be used for serving the request in view of the reception time of the request.

In one or more embodiments, the third chunk (chunk(N, 3)) and the bootstrapping data for this chunk (chunk(N,3)) correspond to each other in that the bootstrapping data for chunk(N,3) comprise a sequence of one or more images starting with an I-type encoded image which corresponds to an image of a chunk (e.g. chunk(N,2)) that precedes the third chunk in the current segment (201a).

In one or more embodiments, the media distribution unit may generate a response media data chunk (203) intended to be used in place of the third chunk (Chunk(N,3)) for serving the request by combining data of the third chunk (Chunk (N,3)) and its corresponding bootstrapping data.

As illustrated on FIG. 4b, the response media data chunk (203) may be built by combining the P-Type image and the I-Type image of the bootstrap data for the third chunk (chunk(N,3)) with the images of the third chunk (Chunk(N, 3)). In the context of the exemplary third chunk (Chunk(N, 3)) of FIG. 4b, the response media data chunk (203) may be built by combining the P-Type image of the bootstrapping data for chunk(N,3) with the two B-Type images of the third chunk that refer in the segment N to the P-Type image of the second chunk (Chunk(N,2)). Therefore the response chunk (203) may no longer comprise a B-Type image which refers to an image of the preceding (second) chunk of the current segment. The bootstrapping data for chunk(N,3) may comprise a I-Type image corresponding to the I-Type image of the first chunk (Chunk(N,1)), to which the P-Type image of the bootstrapping data refers.

As a result, the response media data chunk (203) includes two B-Type images that respectively correspond to two B-Type images of the third chunk (Chunk(N,3)), and which refer to a P-Type image from the bootstrapping data which is also included in the response media data chunk (203), which further includes an I-Type image to which the P-Type image refers.

As constructed, the response media data chunk (203) can therefore be used by a video player upon receipt for decoding and playing data of segment N, as of the response media data chunk (203) based on the third chunk, and followed by the fourth chunk.

In some embodiments, the media distribution unit may generate the response chunk (203), and may serve the request based on the response chunk (203), for example by sending the response chunk (203) to the network node originator of the request (e.g. a video player originator of the request).

According to another aspect of the present subject disclosure, a method for encoding video data comprising a sequence of images is proposed.

In some embodiments, a first image of the sequence of images may be encoded (e.g. using one or more previously encoded images of the sequence) to generate an encoded first image. The first image may also be encoded as an I-type encoded image.

Once the encoded first image has been generated, a media data chunk that comprises the encoded first image may be generated.

Further, once the I-type encoded image is generated, a bootstrapping file that comprises a sequence of one or more images and starts with the I-type encoded image maybe generated.

Therefore, according to embodiments of the present subject disclosure, image data may be encoded as an I-type, B-type or P-type encoded image, for example using any suitable image encoding scheme, and such image data may also be encoded as an I-type image (e.g. using the same encoding scheme) if it was not already encoded as an I-type image. A bootstrapping file that corresponds to the media data chunk that comprises the encoded first image may therefore be generated based on the corresponding I-type encoded image.

In one or more embodiments, the proposed method for encoding video data may comprise the encoding of a first image of the sequence of images to generate an encoded first image.

Based on that the first image was encoded using one or more previously encoded images of the sequence (for example was encoded as a B-type image or as a P-type image, in contrast with being encoded as an I-type image), the first image is also encoded as an I-type encoded image. Therefore two encoded versions of the first image are generated by differently encoding the first image.

Otherwise, that is, in cases where the first image was not encoded using one or more previously encoded images of the sequence (for example was encoded as a an I-type image), the I-type encoded image generated from the encoding of the first image is used for generating the bootstrapping file.

A media data chunk that comprises the encoded first image may then be generated.

A bootstrapping file that comprises a sequence of one or more images, and corresponding to the media data chunk may also be generated. Based on that the first image was encoded using one or more previously encoded images of the sequence (for example was encoded as a B-type image or as a P-type image, in contrast with being encoded as an I-type image), the bootstrapping file may start with the I-type encoded image which was also generated. Otherwise (for example in cases where the first image was already encoded as an I-type image), the bootstrapping file may start with the encoded first image (that is, an I-type encoded image).

In one or more embodiments, the proposed method for encoding video data may further comprise: generating a primary media content stream comprising the media data chunk; generating a secondary media content stream comprising the bootstrapping file; and transmitting the primary and secondary media content streams to a media distribution unit of a video distribution network.

In one or more embodiments, whether related to the proposed method for processing a media content stream or to the proposed method for encoding video data, the media data chunk and the bootstrapping file may correspond to each other in that they each comprise a P-type encoded image generated by P-type encoding a same image, wherein the same image corresponds to a first image of source video data comprising a sequence of images that was encoded using one or more previously encoded images of the sequence of images, and wherein the I-type image of the bootstrapping file corresponds to a second image preceding in a display sequence the first image in the source video data, the second image being encoded using intra prediction.

In one or more embodiments, whether related to the proposed method for processing a media content stream or to the proposed method for encoding video data, the media data chunk may be a Common Media Application Format, CMAF, chunk, CMAF Low Latency, CMAF-LL, chunk, Dynamic Adaptive Streaming over Hypertext Transfer Protocol, HTTP, DASH, chunk, DASH Low Latency, DASH-LL, chunk, HTTP Live Streaming, HLS, chunk, or a HLS Low Latency, HLS-LL, chunk.

In one or more embodiments, whether related to the proposed method for processing a media content stream or to the proposed method for encoding video data, the bootstrapping file may comprise an I-type encoded image, an I-type encoded image and a P-type encoded image that refers to the I-type encoded image, or an I-type encoded image and a B-type encoded image that refers to the I-type encoded image.

In one or more embodiments, whether related to the proposed method for processing a media content stream or to the proposed method for encoding video data, the bootstrapping file may be generated as corresponding to the generated media data chunk, for example in that the I-type image of the bootstrapping file corresponds to an image of a media data chunk that (e.g. immediately) precedes the media data chunk in a media data segment. For example, the I-type image of the bootstrapping file and its corresponding image in the media data chunk may correspond to image data that has been encoded to produce an I-type image for the bootstrapping file, and to produce image encoded differently from an I-type image (e.g. a B-type image or a P-type image) for the media data chunk.

Depending on the embodiment, whether related to the proposed method for processing a media content stream or to the proposed method for encoding video data, each generated bootstrapping file may comprise a sequence of one or more images starting with an I-type image, and possibly further comprising one or more of a P-type image and a B-type image. Therefore, in some embodiments, three types of bootstrapping image sequence may be generated: a so-called "I-type" bootstrapping sequence that starts with an I-type image and may not comprise any P-type or B-type image, a so-called "I+P" bootstrapping sequence that starts with an I-type image and further comprises a P-type image, and a so-called "+B" bootstrapping sequence that starts with an I-type image and further comprises a B-type image.

Depending on the embodiment, one or more of the I-type bootstrapping sequence, I+P bootstrapping sequence, and I+B bootstrapping sequence may be generated in respective bootstrapping files for implementing the proposed method for encoding video data according to embodiments of the present subject disclosure. In some embodiments, the generated bootstrapping sequence may be an I+B type bootstrapping sequence in cases where the media data chunk that (e.g. immediately) precedes the media data chunk in the media data segment ends with a B-type image, the bootstrapping sequence may be an I+P type bootstrapping sequence in cases where the media data chunk that (e.g. immediately) precedes the media data chunk in the media data segment ends with a P-type image, and the bootstrapping sequence may be an I-type bootstrapping sequence in cases where the media data chunk that (e.g. immediately) precedes the media data chunk in the media data segment ends with an I-type image.

Figure 5A:
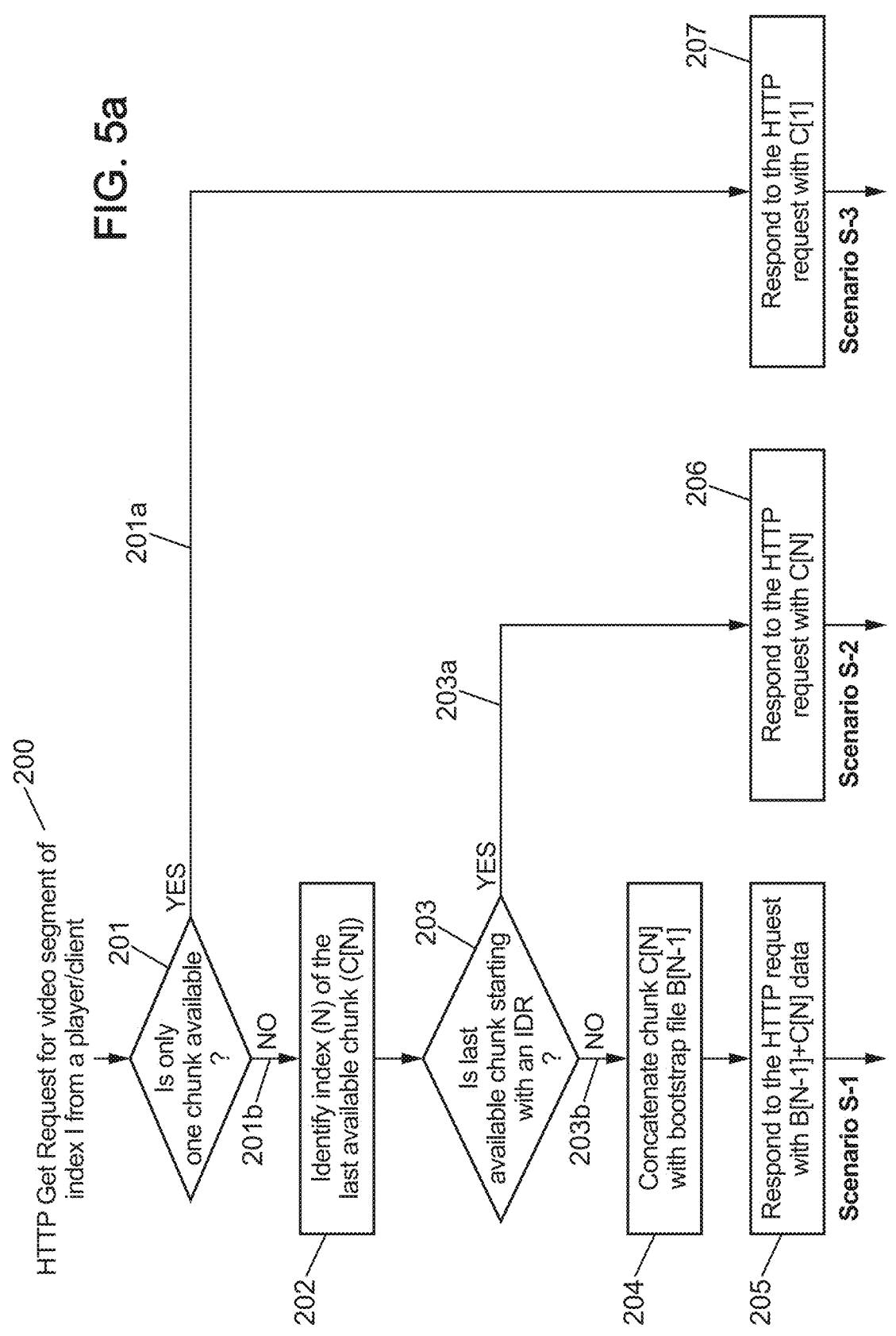
FIG. 5a illustrates an exemplary method for processing a media content stream in an OTT multimedia distribution system in accordance with one or more embodiments.

FIG. 5a illustrates an exemplary method for processing a media content stream in an OTT multimedia distribution system in accordance with one or more embodiments. FIGS. 5b-5f illustrate exemplary scenarios that can be used by a media distribution unit configured according to one or more embodiments of the present subject disclosure.

In the following, the exemplary and non-limiting case of an Instantaneous Decoding Refresh (IDR) image is used as a specific example of an I-type image.

As shown on FIG. 5a, in one or more embodiments, a media distribution unit may be configured to receive (200), from a player or a client, a request for data of a media data segment of index I of a media content stream, for example in the form of an HTTP GET request.

In some embodiments, the media distribution unit may be configured for determining (201), upon receipt of the request, whether only one chunk is available for distribution in the requested media data segment of the media content stream.

In some embodiments, the media distribution unit may be configured for, further to determining (201a) that only one chunk is available for distribution, responding (207) to the request with this sole chunk. This scenario, which is referred to in the following as "Scenario S-3", is illustrated by FIG. 5f and described in further details below in reference to FIG. 5f.

In some embodiments, the media distribution unit may be configured for, further to determining (201b) that more than one chunks of the requested media data segment are available for distribution, identifying (202) the last available chunk in the requested media data segment, for example through its index in the segment.

In some embodiments, once the last available chunk in the requested media data segment is identified, the media distribution unit may determine (203) whether or not this last available chunk starts with an IDR (instantaneous decoding refresh) image.

In some embodiments, further to determining (203a) that the last available chunk starts with an IDR image, the media distribution unit may respond (206) to the to the request with this last available chunk C[N], starting with the IDR image. This scenario, which is referred to in the following as "Scenario S-2", is illustrated by FIG. 5e and described in further details below in reference to FIG. 5e.

In some embodiments, further to determining (203b) that the last available chunk does not start with an IDR image, the media distribution unit may concatenate (204) the first image of the last available chunk C[N] with bootstrap data B[N−1] associated with the preceding chunk C[N−1] in the requested segment, thereby generating a response chunk comprising the concatenation of data of the last available chunk C[N] with the bootstrap data B[N−1].

In some embodiments, the media distribution unit may respond to the request with the response chunk which comprises data of the last available chunk C[N] concatenated with the bootstrap data B[N−1]

Figure 5B:
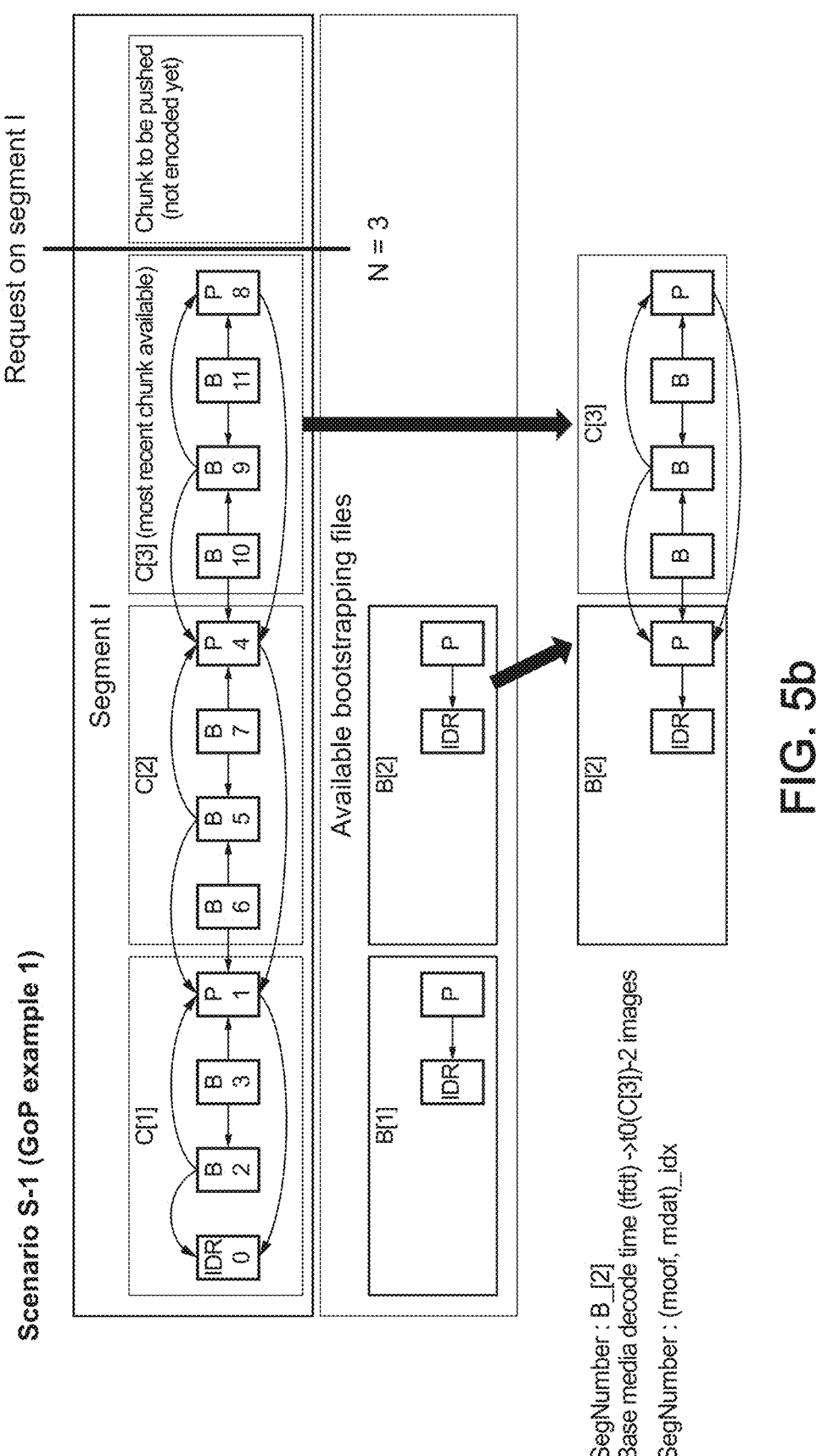
FIGS. 5b-5f illustrate exemplary scenarios that can be used by a media distribution unit configured according to one or more embodiments of the present subject disclosure.
Figure 5C:
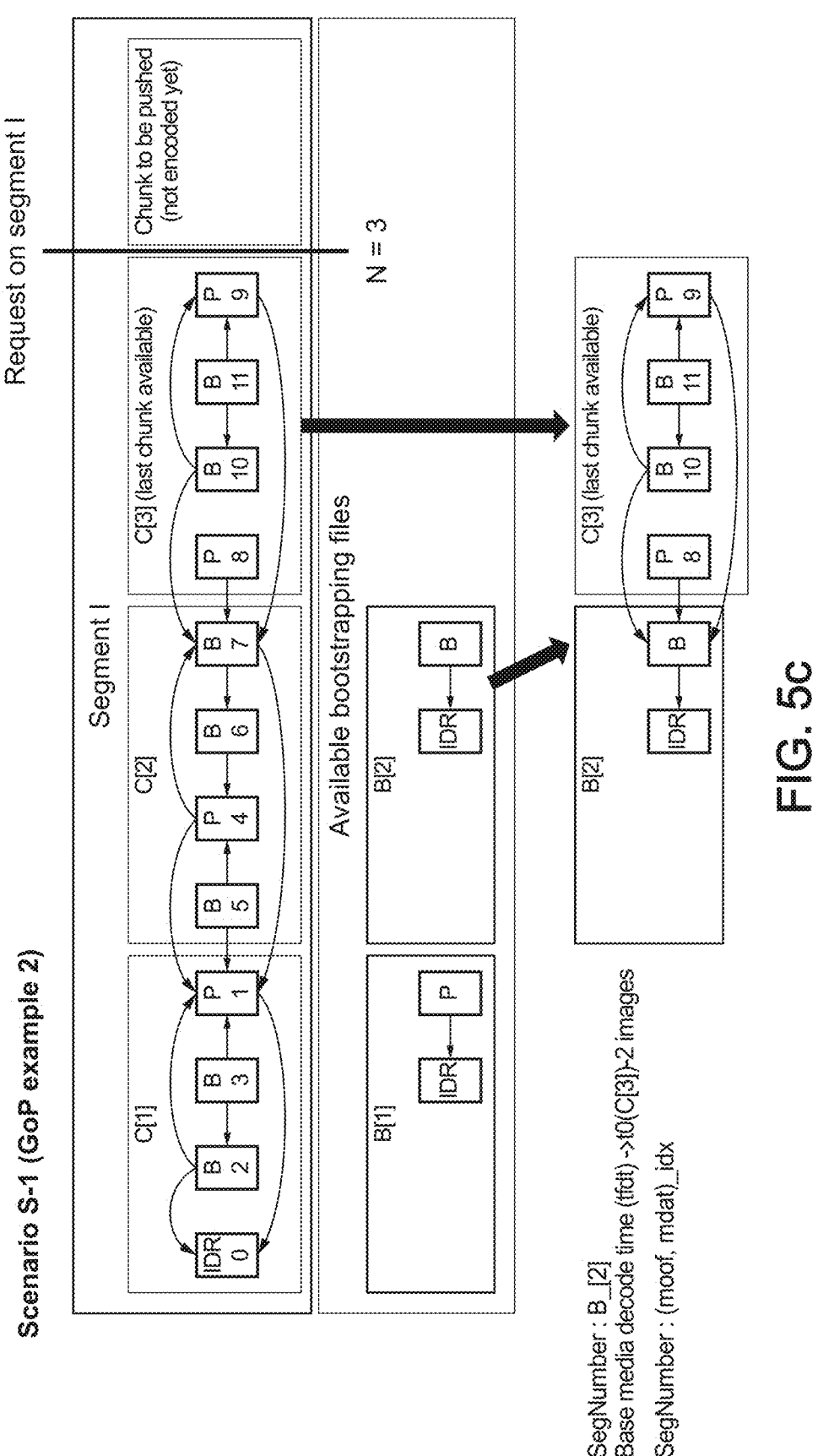
Figure 5D:
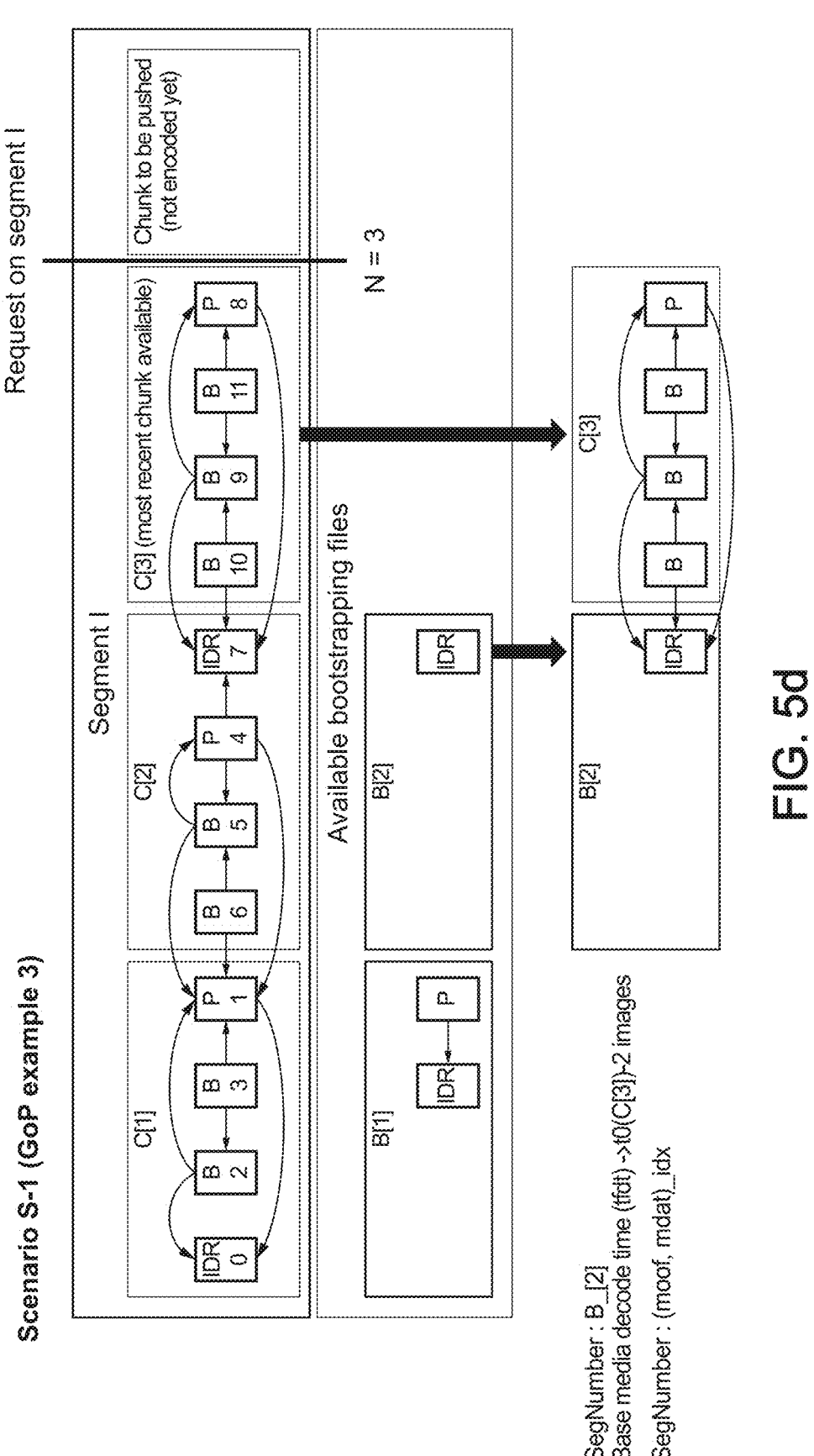
Figure 5E:
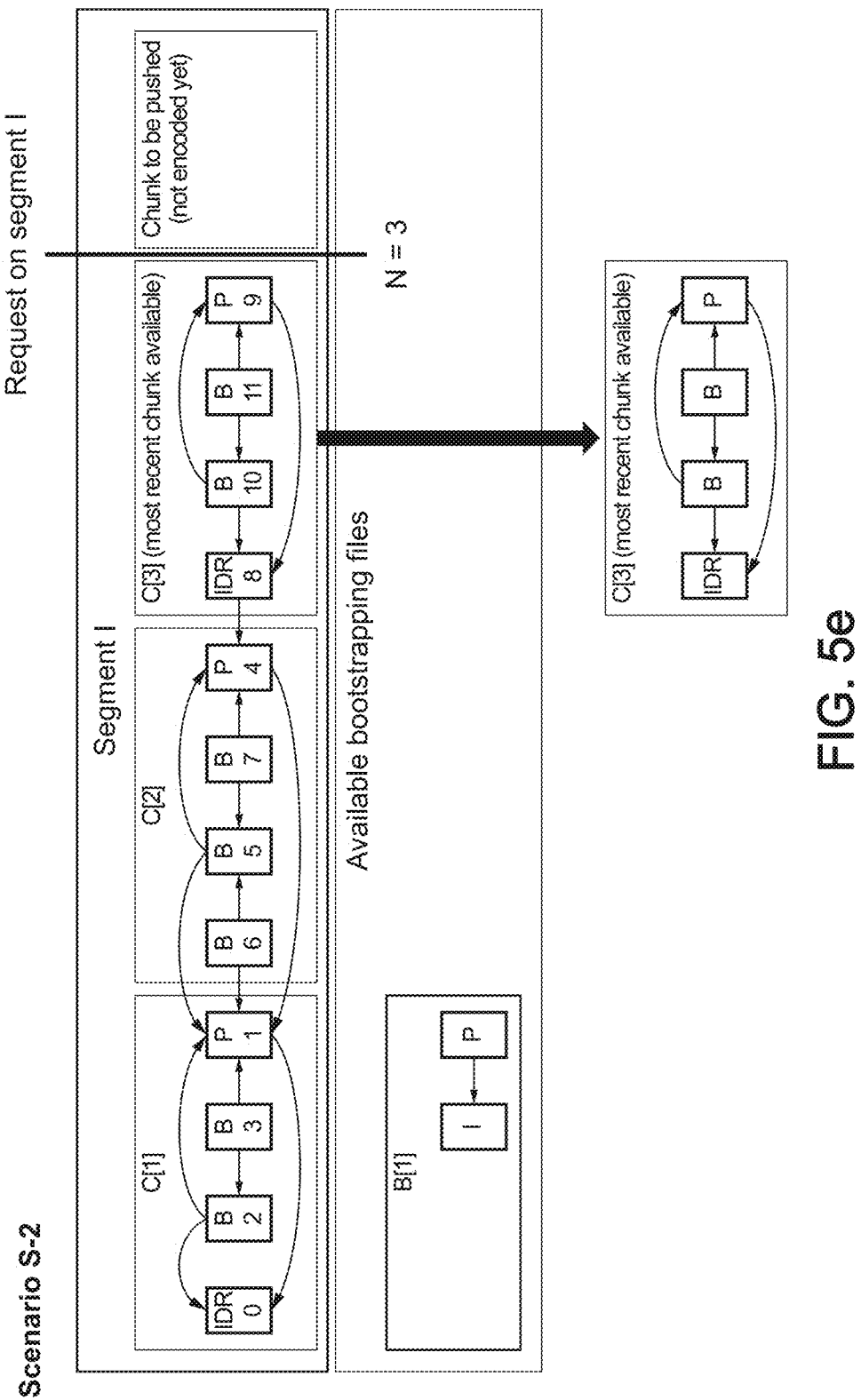
Figure 5F:
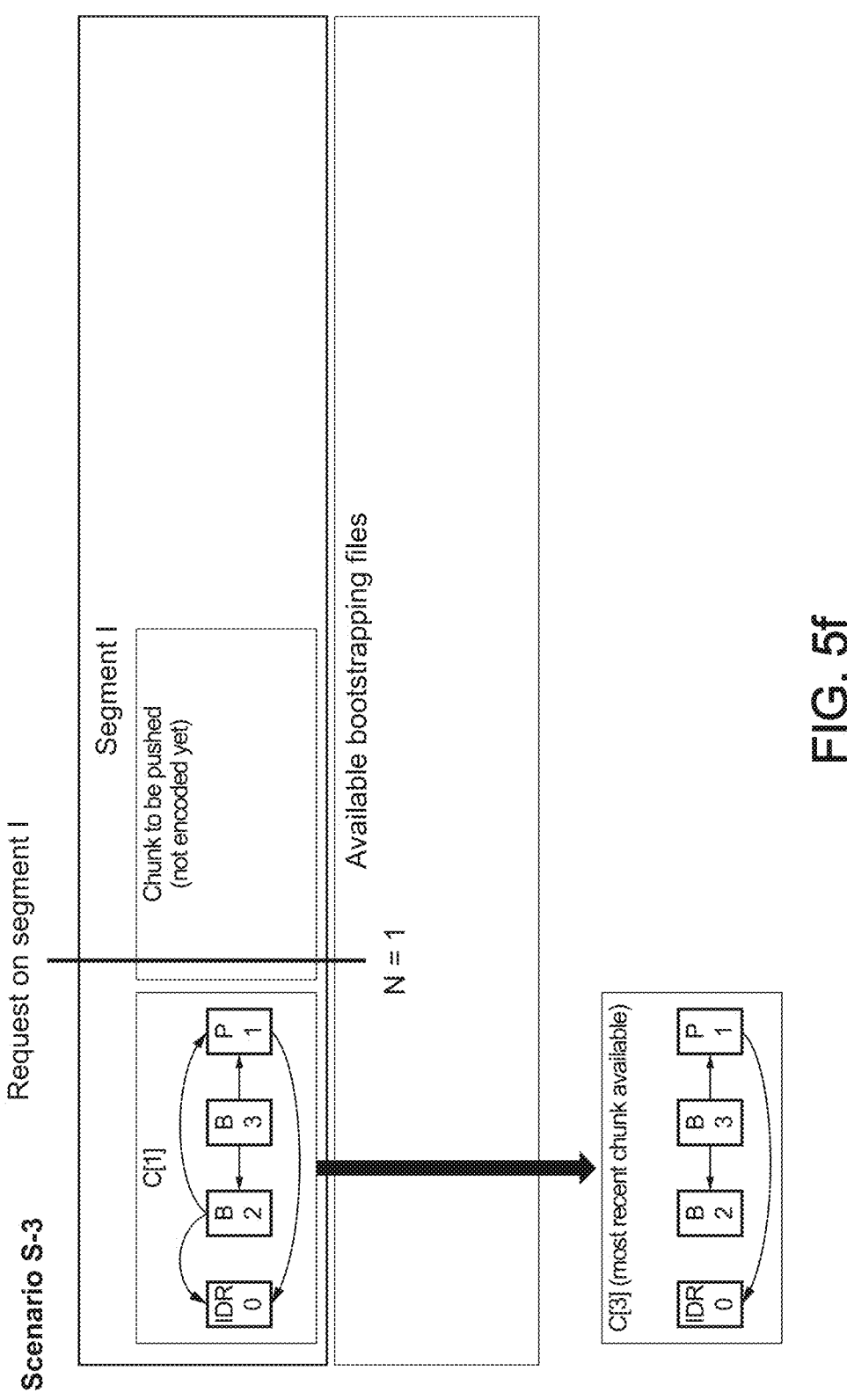

This scenario, which is referred to in the following as "Scenario S-1", is illustrated by FIGS. 5b-5d and described in further details below in reference to FIGS. 5b-5d.

Shown on FIG. 5b is a first exemplary scenario S-1.

A media data segment I comprises a sequence of T chunks C[1], . . . , C[T], indexed 1 to T according to an order in which they are made available for distribution to players or clients.

In the example of FIG. 5b, a request for data of segment I is received at a time where the first 3 chunks (C[1], C[2], and C[3]) of segment I are available for distribution, while the other chunks of the segment are not available for distribution. The most recently available chunk is therefore the third chunk, so that the media distribution unit identifies the third chunk as the last available chunk, for example through identifying the index (N=3) of such chunck.

As shown on FIG. 5b, the last available chunk C[N] (as illustrated, C[3]) does not start with an IDR image, but instead with a B-type image, which refers to a P-type image of the preceding chunk (C[2]), and another B-type image of the third chunk.

Further to the determination that the chunk C[3] does not start with an IDR image (but instead with a B-image), the chunk C[3] is concatenated with the bootstrap file B[2] which is associated with the preceding chunk C[2]. The bootstrapping file B[2] corresponds to the chunk C[2] in that it contains an IDR image which corresponds to an image of the chunk C[2]. The IDR image may be generated from the same image data as the corresponding image of the chunk C[2], except that such image data is encoded to generate an I-type image for generating the bootstrapping file B[2]. The bootstrapping file B[2] may further include a P-type image that corresponds, as it may for example be encoded from the same image data and in the same manner as, the last P-type image of the second chunk C[2] shown on FIG. 5b. The P-type image of the bootstrapping file B[2] may refer to the IDR image of B[2].

This first exemplary scenario S-1 therefore illustrates an exemplary case where the bootstrapping file comprises an I-type image and a P-type image. In some embodiments, the I-type image may be generated from the same image data as the corresponding image of the chunk to which the boot-strapping file corresponds, except that such image data may be encoded to generate an I-type image for generating the bootstrapping file. The P-type image of the bootstrapping file may correspond, as it may for example be encoded from the same image data and in the same manner as, a P-type image of the chunk to which the bootstrapping file corre-sponds. The P-type image of the bootstrapping file may refer to the I-type image of the bootstrapping file.

A response chunk may be generated by concatenating C[3] with B[2], each of the images of the chunk C[3] referring to the P-type image of C[2] now referring to the P-type image of B[2] instead of the P-type image of C[2].

As the generated response chunk starts with an IDR image, it may be used for responding to the request for segment I as the first chunk made available for segment I, thereby achieving a reduced latency time as well as a reduced zapping time as compared to conventional systems.

Shown on FIG. 5c is a second exemplary scenario S-1.

This exemplary scenario is identical to the scenario illus-trated by FIG. 5b, except that the second chunk C[2] includes a B-type image to which one or more images of the last available chunk C[3] refer. For example, as illustrated, a P-type image and a B-type image of the last available chunk C[3] refer to the last B-type image of the previous chunk C[2].

Correspondingly, the bootstrapping file associated with the second chunk C[2] comprises the IDR image with a B-type image, instead of the IDR image with a P-type image.

Further to the determination that the chunk C[3] does not start with an IDR image (but instead with a P-image), the chunk C[3] is concatenated with the bootstrap file B[2] which is associated with the preceding chunk C[2]. The bootstrapping file B[2] corresponds to the chunk C[2] in that it contains an IDR image which corresponds to an image of the chunk C[2]. The IDR image may be generated from the same image data as the corresponding image of the chunk C[2], except that such image data is encoded to generate an I-type image for generating the bootstrapping file B[2]. The bootstrapping file B[2] may further include a B-type image that corresponds, as it may for example be encoded from the same image data and in the same manner as, the last B-type image of the second chunk C[2] shown on FIG. 5c. The B-type image of the bootstrapping file B[2] may refer to the IDR image of B[2].

This second exemplary scenario S-1 therefore illustrates an exemplary case where the bootstrapping file comprises an I-type image and a B-type image. In some embodiments, the I-type image may be generated from the same image data as the corresponding image of the chunk to which the boot-strapping file corresponds, except that such image data may be encoded to generate an I-type image for generating the bootstrapping file. The B-type image of the bootstrapping file may correspond, as it may for example be encoded from the same image data and in the same manner as, a B-type image of the chunk to which the bootstrapping file corre-sponds. The B-type image of the bootstrapping file may refer to the I-type image of the bootstrapping file.

A response chunk may be generated by concatenating C[3] with B[2], each of the images of the chunk C[3] referring to the B-type image of C[2] now referring to the B-type image of B[2] instead of the B-type image of C[2].

As the generated response chunk starts with an IDR image, it may be used for responding to the request for segment I as the first chunk made available for segment I, thereby achieving a reduced latency time as well as a reduced zapping time as compared to conventional systems.

Shown on FIG. 5d is a third exemplary scenario S-1.

This exemplary scenario is identical to the scenario illus-trated by FIG. 5b, except that the second chunk C[2] includes an I-type image to which one or more images of the last available chunk C[3] refer. For example, as illustrated, a P-type image and a B-type image of the last available chunk C[3] refer to the last I-type image of the previous chunk C[2].

Correspondingly, the bootstrapping file associated with the second chunk C[2] comprises only the IDR image.

Further to the determination that the chunk C[3] does not start with an IDR image (but instead with a B-image), the chunk C[3] is concatenated with the bootstrap file B[2] which is associated with the preceding chunk C[2]. The bootstrapping file B[2] corresponds to the chunk C[2] in that it contains an IDR image which corresponds to the IDR image of the chunk C[2]. The IDR image may be generated from the same image data as the corresponding image of the chunk C[2], and such image data may have been encoded in both cases to generate an I-type image for generating the bootstrapping file B[2] and for generating the corresponding IDR image of the chunk C[2]. In some embodiments, the chunk C[2] and the associated bootstrapping file B[2] may comprise the same IDR image.

A response chunk may be generated by concatenating C[3] with B[2], each of the images of the chunk C[3] referring to the IDR image of C[2] now referring to the IDR image of B[2] instead of the IDR image of C[2].

This third exemplary scenario S-1 therefore illustrates an exemplary case where the bootstrapping file comprises only an I-type image (with no B-type or P-type image). In some embodiments, the I-type image may be generated from the same image data as the corresponding image of the chunk to which the bootstrapping file corresponds. In some embodiments, the I-type image of the bootstrapping file may be identical to the I-type image of the corresponding chunk.

As the generated response chunk starts with an IDR image, it may be used for responding to the request for segment I as the first chunk made available for segment I, thereby achieving a reduced latency time as well as a reduced zapping time as compared to conventional systems.

Shown on FIG. 5e is an exemplary scenario S-2.

This exemplary scenario is illustrated with the same framework as that used in FIG. 5b-5d.

In this scenario S2 however, the last available chunk C[3] starts with an IDR image.

In such case this last available chunk can be directly used for responding to the request for data of the segment i. The last available chunk may therefore be used as a response chunk in cases where it is determined that it starts with an IDR image.

As the response chunk starts with an IDR image, it may be used for responding to the request for segment I as the first chunk made available for segment i, thereby achieving a reduced latency time as well as a reduced zapping time as compared to conventional systems.

Shown on FIG. 5f is an exemplary scenario S-3.

This exemplary scenario is illustrated with the same framework as that used in FIG. 5b-5e.

In this scenario S3 however, the only available chunk for distribution is the first chunk C[1] of the segment I.

In such case this only available chunk can be directly used for responding to the request for data of the segment I. The only available chunk may therefore be used as a response chunk in cases where it is determined that there is only one chunk which is available for distribution for serving the request for data of the segment I. As this only available chunk is the first chunk C[1] of the segment, it starts with an IDR image.

As the response chunk starts with an IDR image, it may be used for responding to the request for segment I as the first chunk made available for segment I, thereby achieving a reduced latency time as well as a reduced zapping time as compared to conventional systems.

Figure 6A:
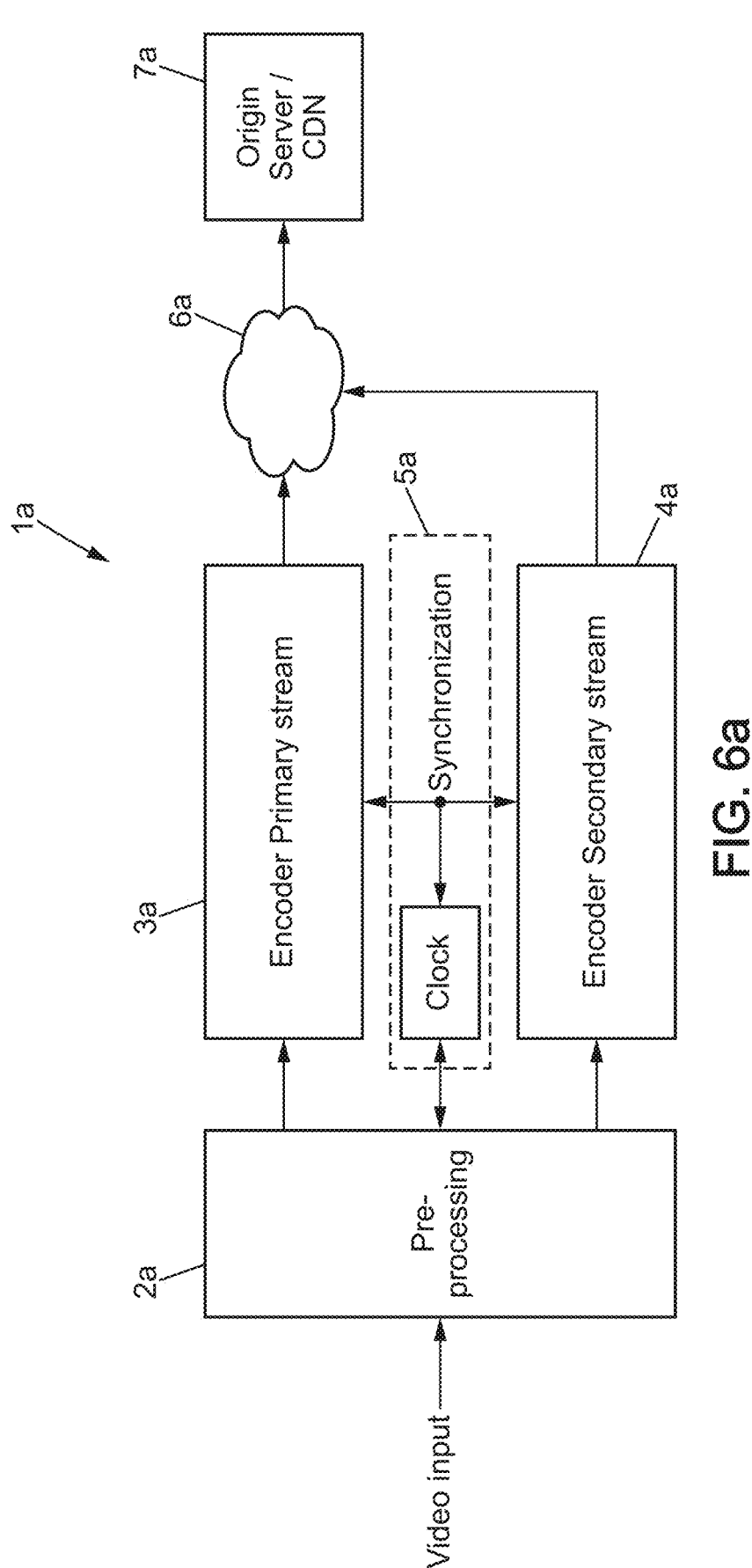
FIG. 6a is a block diagram of an exemplary video encoding apparatus in accordance with one or more embodiments.

FIG. 6a illustrates an exemplary apparatus or unit 1a configured to serve as an media (e.g. video) encoding unit, for example a video encoder, in accordance with embodiments of the present subject disclosure.

The apparatus 1a, which may comprise one or more computers, includes a control engine, an input interface engine, an output interface engine, a memory, a pre-processing engine 2a, a primary stream encoder engine 3a, a secondary stream encoder engine 4a, and a clock and synchronization engine 5a.

In one or more embodiments, all of the input interface engine, output interface engine, memory, pre-processing engine, primary stream encoder engine, secondary stream encoder engine, and clock and synchronization engine may be operatively coupled with one another through the control engine.

In some embodiments, the input interface engine is configured to perform various aspects of embodiments of one or more of the proposed methods for processing a media content stream as described herein, such as without limitation related to receiving video input data for encoding by the apparatus 1a.

In some embodiments, the pre-processing engine 2a is configured to perform various aspects of embodiments of one or more of the proposed methods for encoding video data as described herein, such as without limitation related to pre-processing the input video data received by the input interface engine for generating two video streams to be encoded in parallel by the primary stream encoder engine 3a and the secondary stream encoder engine 4a, respectively, and that are comprised in the processed media content stream.

In one or more embodiments, the apparatus 1a is configured to generate two encoded bitstreams, a primary multimedia content stream and a secondary multimedia content stream. The primary multimedia content stream may be generated in a conventional manner using any suitable multimedia content (e.g. video) encoding scheme, for example using advanced video compression standards (such as, but not limited to, HEVC, AV1 or VVC, or typically any video compression scheme which performs a bitrate compression by a factor of 100 or more as compared to a SDI bitrate), and once generated may comprise a sequence of segments, each comprising a sequence of media data chunks. The secondary multimedia content stream may be generated by generating bootstrap data respectively corresponding to media data chunks of the primary multimedia content stream. For example, the secondary multimedia content stream may comprise a sequence of segments respectively corresponding to that of the primary multimedia content stream, each comprising a sequence of bootstrap chunks respectively corresponding to the sequence of chunks of the segments of the primary multimedia content stream.

For example, in some embodiments, the encoded primary multimedia content stream and the encoded secondary multimedia content stream may comprise respective sequences of chunks, whereby a chunk of the encoded secondary multimedia content stream corresponds to a corresponding chunk in the encoded primary multimedia content stream. The chunk of the primary multimedia content stream may be referred to in the following as the "normal" chunk, or the "normal version" of the chunk, as it is generated in a conventional manner using any suitable encoding scheme, whereas the chunk of the secondary multimedia content stream corresponding to the chunk of the primary multimedia content stream may be referred to in the following as the "bootstrap" chunk, or the "bootstrap version" of the chunk.

In some embodiments, the primary stream encoder engine 3a is configured to perform various aspects of embodiments of one or more of the proposed methods for encoding video data as described herein, such as without limitation related to encoding the input video data to generate the primary stream (comprising the normal chunks).

In some embodiments, the secondary stream encoder engine 4a is configured to perform various aspects of embodiments of one or more of the proposed methods for encoding video data as described herein, such as without limitation related to encoding the input video data to generate the secondary stream (comprising bootstrap chunks respectively corresponding to the normal chunks).

In one or more embodiments, each chunk is encoded in two versions, by the primary stream encoder engine 3a and the secondary stream encoder engine 4a, respectively: a normal version, which results in a sequence of chunks denoted C[idx], and a bootstrap version, which results in a sequence of bootstrap chunks denoted B[idx]. In one or more embodiments, the bootstrap version of a chunk may be generated so that it is closed by the same encoding type of image (e.g. I-type, B-type, P-type) as the corresponding normal version of the chunk. Therefore, depending on the normal version of a chunk, the bootstrap version of the chunk may be generated to comprise only a type-I image, a type-I image and a type-P image, or a type-I image and a type-B image, so that the last image of the bootstrap version of a chunk is an encoded image with encoding of the same type as used for encoding the last image of the normal version of the chunk.

In some embodiments, the apparatus 1a may be configured so that images in a chunk may refer to the last image of the previous chunk in temporal order, whatever the encoding type of image.

In some embodiments, the apparatus 1a may be configured so that the base media decode time (tfdt) is shorter than regular frame (typically 1/Fr for I or 2/Fr for I+P/I+B).

In some embodiments, the clock and synchronization engine 5a is configured to perform various aspects of embodiments of one or more of the proposed methods for encoding video data as described herein, such as without limitation related to providing to the primary stream encoder engine 3a and the secondary stream encoder engine 4a a reference clock for generating, for example in parallel, in a synchronized manner the two versions (normal version and bootstrap version) of the chunks. In this regard, in some embodiments, timing information of the bootstrap sequence may preferentially be set to signal the shortest duration compared to other chunks.

In some embodiments, the output interface engine is configured to perform various aspects of embodiments of one or more of the proposed methods for encoding video data as described herein, such as without limitation related to outputting the two generated primary multimedia content stream and secondary multimedia content stream, for example to an origin server or CDN node 7a through a data communication network 6a.

The control engine of the apparatus 1a includes a processor, which may be any suitable microprocessor, microcontroller, Field Programmable Gate Arrays (FPGA), Application Specific Integrated Circuits (ASIC), Digital Signal Processing chip, and/or state machine, or a combination thereof. According to various embodiments, one or more of the computers used for implementing the proposed methods can be configured as a multi-processor computer having multiple processors for providing parallel computing. The control engine may also comprise, or may be in communication with, computer storage media, such as, without limitation, the memory of the apparatus 1a, capable of storing computer program instructions or software code that, when executed by the processor, causes the processor to perform various acts of the methods described herein. In addition, the memory may be any type of data storage computer storage medium, capable of storing a data structure representing a computer network to which the apparatus 1a belongs, coupled to the control engine thereof and operable with the input interface engine, output interface engine, pre-processing engine, primary stream encoder engine, secondary stream encoder engine, and clock and synchronization engine to facilitate management and processing of data stored in association therewith.

It will be appreciated that the apparatus 1a shown and described with reference to FIG. 6a is provided by way of example only. Numerous other architectures, operating environments, and configurations are possible. Other embodiments of the apparatus may include fewer or greater number of components and may incorporate some or all of the functionality described with respect to the apparatus components shown in FIG. 6a. Accordingly, although the control engine, input interface engine, output interface engine, memory, pre-processing engine, primary stream encoder engine, secondary stream encoder engine, and clock and synchronization engine are illustrated as part of the apparatus 1a, no restrictions are placed on the location and control of these components. In particular, in other embodiments, any of these components may be part of different entities, servers, or computing systems.

Figure 6B:
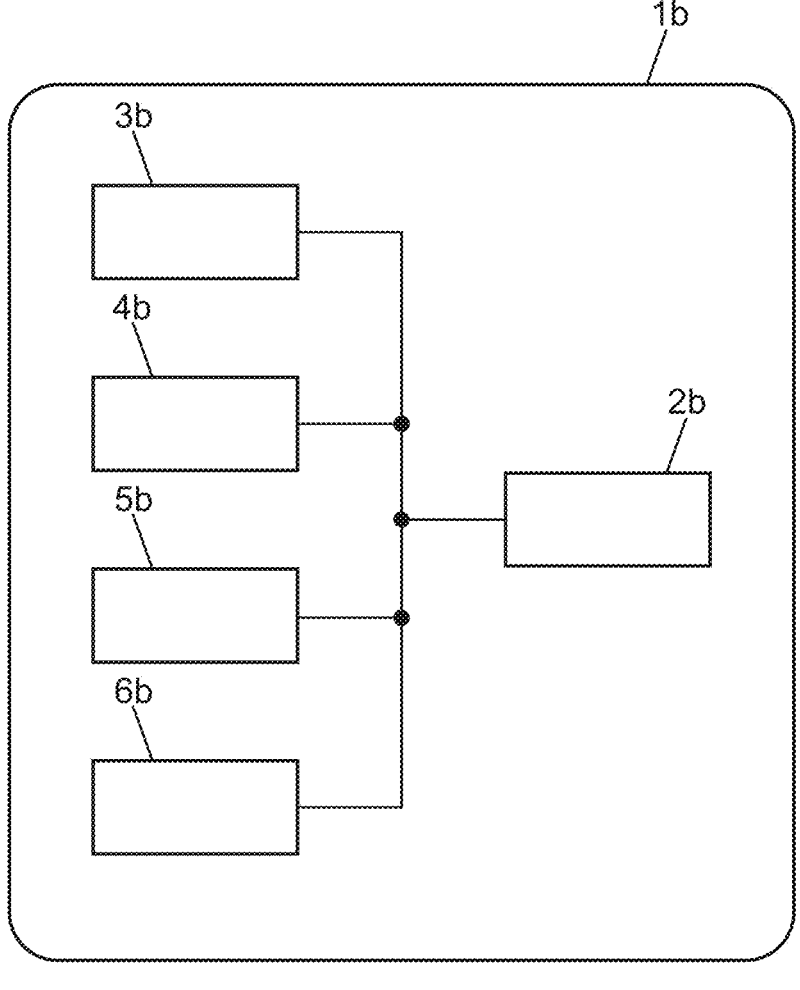
FIG. 6b is a block diagram of an exemplary media distribution apparatus in accordance with one or more embodiments.

FIG. 6b illustrates an exemplary apparatus or unit 1b configured to serve as a media (e.g. video) distribution unit, for example a video packager, in accordance with embodiments of the present subject disclosure.

The apparatus 1b, which may comprise one or more computers, includes a control engine 2b, an input interface engine 3b, an output interface engine 4b, a media processing engine 5b, and a memory 6b.

In the architecture illustrated on FIG. 6b, all of the input interface engine 3b, output interface engine 4b, media processing engine 5b, and memory 6b are operatively coupled with one another through the control engine 2b.

In some embodiments, the media processing engine 5b is configured to perform various aspects of embodiments of one or more of the proposed methods for processing a media content stream as described herein, such as without limitation related to processing media content streams and corresponding bootstrapping data received by the input interface engine 3b.

In some embodiments, the input interface engine 3b is configured to perform various aspects of embodiments of one or more of the proposed methods for processing a media content stream as described herein, such as without limitation related to receiving encoded media content streams and corresponding bootstrapping data to be processed as described herein.

In some embodiments, the output interface engine 4b is configured to perform various aspects of embodiments of one or more of the proposed methods for processing a media content stream as described herein.

The control engine 2b includes a processor, which may be any suitable microprocessor, microcontroller, Field Programmable Gate Arrays (FPGA), Application Specific Integrated Circuits (ASIC), Digital Signal Processing chip, and/or state machine, or a combination thereof. According to various embodiments, one or more of the computers used for implementing the proposed methods can be configured as a multi-processor computer having multiple processors for providing parallel computing. The control engine 2b may also comprise, or may be in communication with, computer storage media, such as, without limitation, the memory 6b, capable of storing computer program instructions or software code that, when executed by the processor, causes the processor to perform various acts of the methods described herein. In addition, the memory 6b may be any type of data storage computer storage medium, capable of storing a data structure representing a computer network to which the apparatus 1 belongs, coupled to the control engine 2b and operable with the input interface engine 3b, output interface engine 4b, and media processing engine 5b to facilitate management and processing of data stored in association therewith.

It will be appreciated that the apparatus 1 shown and described with reference to FIG. 6b is provided by way of example only. Numerous other architectures, operating environments, and configurations are possible. Other embodiments of the apparatus may include fewer or greater number of components and may incorporate some or all of the functionality described with respect to the apparatus components shown in FIG. 6*b*. Accordingly, although the control engine 2*b*, input interface engine 3*b*, output interface engine 4*b*, media processing engine 5*b*, and memory 6*b* are illustrated as part of the apparatus 1*b*, no restrictions are placed on the location and control of components 2*b*-6*b*. In particular, in other embodiments, components 2*b*-6*b* may be part of different entities, servers, or computing systems.

While the invention has been described with respect to preferred embodiments, those skilled in the art will readily appreciate that various changes and/or modifications can be made to the invention without departing from the spirit or scope of the present subject-disclosure as defined by the appended claims.

Although this invention has been disclosed in the context of certain preferred embodiments, it should be understood that certain advantages, features and aspects of the systems, devices, and methods may be realized in a variety of other embodiments. Additionally, it is contemplated that various aspects and features described herein can be practiced separately, combined together, or substituted for one another, and that a variety of combination and sub-combinations of the features and aspects can be made and still fall within the scope of the invention. Furthermore, the systems and devices described above need not include all of the modules and functions described in the preferred embodiments.

Information and signals described herein can be represented using any of a variety of different technologies and techniques. For example, data, instructions, commands, information, signals, bits, symbols, and chips can be represented by voltages, currents, electromagnetic waves, magnetic fields or particles, optical fields or particles, or any combination thereof.

Depending on the embodiment, certain acts, events, or functions of any of the methods described herein can be performed in a different sequence, may be added, merged, or left out altogether (e.g., not all described acts or events are necessary for the practice of the method). Moreover, in certain embodiments, acts or events may be performed concurrently rather than sequentially.

The invention claimed is:

1. A method for processing a media content stream comprising, at a media distribution unit of a video distribution network, the media distribution unit comprising a processor and a memory for storing media data, wherein the memory storing one or more media data chunks of the media content stream received by the media distribution unit, and wherein the memory further storing one or more bootstrapping files respectively corresponding to the one or more media data chunks, each of the one or more bootstrapping files comprising a respective sequence of one or more images starting with an I-type encoded image:

upon receiving a request for a media data segment of the media content stream, determining a media data chunk of the one or more media data chunks that corresponds to the segment and is available for distribution;

determining a bootstrapping file of the one or more bootstrapping files that corresponds to the media data chunk, wherein the I-type image of the bootstrapping file corresponds to an image of a media data chunk that precedes the media data chunk in the media data segment;

generating a response media data chunk by combining the media data chunk and the bootstrapping file; and serving the request based on the response media data chunk, wherein the media data chunk and the bootstrapping file correspond to each other in that they each comprise a P-type encoded image generated by P-type encoding a same image, wherein the same image corresponds to a first image of source video data comprising a sequence of images that was encoded using one or more previously encoded images of the sequence of images, and wherein the I-type image of the bootstrapping file corresponds to a second image preceding in a display sequence the first image in the source video data, the second image being encoded using intra prediction.

2. The method according to claim 1, wherein the request is a request from a player for switching from receiving previous channel data corresponding to a previous media content stream to receiving new channel data corresponding to the media content stream.

3. The method according to claim 1, wherein determining the media data chunk comprises:

obtaining timestamp information of the media data chunk and selecting the media data chunk among the one or more media data chunks based on the timestamp information.

4. The method according to claim 1, wherein the media content stream comprises a primary media content stream and a secondary media content stream, wherein the primary media content stream comprises the one or more media data chunks, and the secondary media content stream comprises the one or more bootstrapping files corresponding to the one or more media data chunks of the primary media content stream.

5. The method according to claim 4, wherein the resolution of encoded images of the primary media content stream is different from the resolution of encoded images of the secondary media content stream.

6. The method according to claim 4, wherein the primary media content stream does not comprise any media data chunk that comprises an I-type encoded image.

7. The method according to claim 1, wherein the combining the media data chunk and the bootstrapping file comprises: in case of the bootstrapping file corresponding to the media data chunk comprising an I-type image and a P-type image, the I-type image corresponding to an image of a previous media data chunk preceding the media data chunk, and the P-type image referring to the I-type image and corresponding to a P-type image of the media data chunk, the P-type image of the media data chunk being the last image of the media data chunk: replacing the P-type image of the media data chunk with the I-type image and the P-type image of the bootstrapping file; in case of the bootstrapping file corresponding to the media data chunk comprising an I-type image and a B-type image, the I-type image corresponding to an image of a previous media data chunk preceding the media data chunk, and the B-type image referring to the I-type image and corresponding to a B-type image of the media data chunk, the B-type image of the media data chunk being the last image of the media data chunk: replacing the B-type image of the media data chunk with the I-type image and the B-type image of the bootstrapping file; or in case of the bootstrapping file corresponding to the media data chunk comprising an I-type image without a P-type image or a B-type image, the I-type image corresponding to an image of a previous media data chunk preceding the media data chunk: replacing the corresponding image of the media data chunk with the I-type image of the bootstrapping file.

8. The method according to claim 1, wherein the media data chunk is a Common Media Application Format (CMAF) chunk, CMAF Low Latency (CMAF-LL) chunk, Dynamic Adaptive Streaming over Hypertext Transfer Protocol (HTTP DASH) chunk, DASH Low Latency (DASH-LL) chunk, HTTP Live Streaming (HLS) chunk, or a HLS Low Latency (HLS-LL) chunk.

9. The method according to claim 1, wherein the bootstrapping file comprises an I-type encoded image, an I-type encoded image and a P-type encoded image that refers to the I-type encoded image, or an I-type encoded image and a B-type encoded image that refers to the I-type encoded image.

10. An apparatus, the apparatus comprising a processor and a memory operatively coupled to the processor, wherein the apparatus is configured to perform a method for processing a media content stream comprising, at a media distribution unit of a video distribution network, the media distribution unit comprising a processor and a memory for storing media data, wherein the memory stores one or more media data chunks of the media content stream received by the media distribution unit, and wherein the memory further stores one or more bootstrapping files respectively corresponding to the one or more media data chunks, each of the one or more bootstrapping files comprising a respective sequence of one or more images starting with an I-type encoded image: upon receiving a request for a media data segment of the media content stream, determining a media data chunk of the one or more media data chunks that corresponds to the segment and is available for distribution; determining a bootstrapping file of the one or more bootstrapping files that corresponds to the media data chunk, wherein the I-type image of the bootstrapping file corresponds to an image of a media data chunk that precedes the media data chunk in the media data segment; generating a response media data chunk by combining the media data chunk and the bootstrapping file; and serving the request based on the response media data chunk, wherein the media data chunk and the bootstrapping file correspond to each other in that they each comprise a P-type encoded image generated by P-type encoding a same image, wherein the same image corresponds to a first image of source video data comprising a sequence of images that was encoded using one or more previously encoded images of the sequence of images, and wherein the I-type image of the bootstrapping file corresponds to a second image preceding in a display sequence the first image in the source video data, the second image being encoded using intra prediction.

11. The apparatus according to claim 10, wherein the request is a request from a player for switching from receiving previous channel data corresponding to a previous media content stream to receiving new channel data corresponding to the media content stream.

12. The apparatus according to claim 10, wherein determining the media data chunk comprises:

obtaining timestamp information of the media data chunk and selecting the media data chunk among the one or more media data chunks based on the timestamp information.

13. The apparatus according to claim 10, wherein the media content stream comprises a primary media content stream and a secondary media content stream, wherein the primary media content stream comprises the one or more media data chunks, and the secondary media content stream comprises the one or more bootstrapping files corresponding to the one or more media data chunks of the primary media content stream.

14. The apparatus according to claim 13, wherein the resolution of encoded images of the primary media content stream is different from the resolution of encoded images of the secondary media content stream.

15. The apparatus according to claim 13, wherein the primary media content stream does not comprise any media data chunk that comprises an I-type encoded image.

16. The apparatus according to claim 10, wherein the combining the media data chunk and the bootstrapping file comprises: in case of the bootstrapping file corresponding to the media data chunk comprising an I-type image and a P-type image, the I-type image corresponding to an image of a previous media data chunk preceding the media data chunk, and the P-type image referring to the I-type image and corresponding to a P-type image of the media data chunk, the P-type image of the media data chunk being the last image of the media data chunk: replacing the P-type image of the media data chunk with the I-type image and the P-type image of the bootstrapping file; in case of the bootstrapping file corresponding to the media data chunk comprising an I-type image and a B-type image, the I-type image corresponding to an image of a previous media data chunk preceding the media data chunk, and the B-type image referring to the I-type image and corresponding to a B-type image of the media data chunk, the B-type image of the media data chunk being the last image of the media data chunk: replacing the B-type image of the media data chunk with the I-type image and the B-type image of the bootstrapping file; or in case of the bootstrapping file corresponding to the media data chunk comprising an I-type image without a P-type image or a B-type image, the I-type image corresponding to an image of a previous media data chunk preceding the media data chunk: replacing the corresponding image of the media data chunk with the I-type image of the bootstrapping file.

* * * * *